(12) United States Patent
Zhang

(10) Patent No.: US 10,736,124 B2
(45) Date of Patent: Aug. 4, 2020

(54) METHOD AND DEVICE FOR WIRELESS COMMUNICATION IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/286,616

(22) Filed: Feb. 27, 2019

(65) Prior Publication Data
US 2019/0268917 A1    Aug. 29, 2019

(30) Foreign Application Priority Data

Feb. 28, 2018  (CN) .......................... 2018 1 0165463

(51) Int. Cl.
*H04B 7/06* (2006.01)
*H04W 72/12* (2009.01)
*H04L 5/00* (2006.01)

(52) U.S. Cl.
CPC .......... *H04W 72/12* (2013.01); *H04B 7/0617* (2013.01); *H04B 7/0695* (2013.01); *H04L 5/0016* (2013.01)

(58) Field of Classification Search
CPC ... H04B 7/0617; H04B 7/0695; H04L 5/0016; H04L 5/0017; H04W 72/042
See application file for complete search history.

(56) References Cited

U.S. PATENT DOCUMENTS

| | | | |
|---|---|---|---|
| 2019/0045489 A1* | 2/2019 | He | H04L 1/1812 |
| 2019/0190753 A1* | 6/2019 | Bayesteh | H04J 14/007 |
| 2019/0349905 A1* | 11/2019 | Matsuda | H04W 72/0406 |

* cited by examiner

*Primary Examiner* — Hoon J Chung
(74) *Attorney, Agent, or Firm* — Maschoff Brennan

(57) ABSTRACT

A method and device for wireless communication in a UE and a base station is disclosed. In one embodiment, a user equipment receives a first signaling; a first wireless signal is transmitted in Q1 air interface resource(s); wherein the first signal signaling is configured to determine L1 multiple access signatures groups, any one of the L1 multiple access signatures groups includes a plurality of multiple access signatures; each of Q1 air interface resource(s) includes a time frequency resource and a multiple access signature; the first wireless signal comprises Q1 sub wireless signals, the Q1 sub wireless signals are respectively transmitted by Q1 antenna port group(s), any one of Q1 antenna port group(s) is composed of a positive integer number of antenna port groups. This disclosure can improve the efficiency and spectrum utilization of uplink transmission.

20 Claims, 14 Drawing Sheets

METHOD AND DEVICE FOR WIRELESS COMMUNICATION IN UE AND BASE STATION

CROSS REFERENCE TO RELATED APPLICATION

This application claims the priority benefit of Chinese Patent Application Serial Number 201810165463.1, filed on Feb. 28, 2018, the full disclosure of which is incorporated herein by reference.

BACKGROUND

Technical Field

The present disclosure relates to a transmission method and device in a wireless communication system, and more particularly to a method and device for a grant free uplink transmission.

Related Art

In the traditional long-term evolution (LTE) system of the 3rd Generation Partner Project (3GPP), the uplink transmission on the terminal side is often based on grant of the base station. However in the Phase 1 of 5G New Radio (NR) Access Technology, the terminal can perform the grant-free uplink transmission in the air interface resource(s) pre-configured by the base station for reducing the overhead of air interface signaling and improving the spectral efficiency of the system.

Massive MIMO (Multi-Input Multi-Output) is another key technology for wireless communication in the future. By increasing the numbers of antennas, the transmission rate or system capacity is enhanced. Considering the enhancement of multi-antenna technology, the grant-free transmission mode needs to be further enhanced.

SUMMARY

For the grant-free communication, the terminal equipment itself determines the air interface resource(s) occupied by the uplink transmission. The inventor discovered through research that, for massive MIMO, how to determine the uplink transmission beam is a problem to be solved.

In view of the above problems, the present disclosure provides a solution. In case of no conflict, the embodiments and the features in these embodiments in the user equipment of the present disclose can be applied to a base station and vice versa. In case of no conflict, the embodiments and the features in these embodiments of the present disclosure may be combined with each other arbitrarily.

The present disclosure discloses a method for wireless communication in a user equipment (UE), comprising:
 receiving a first signaling; and
 transmitting a first wireless signal in Q1 air interface resource(s);
 wherein the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), the first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one embodiment, the first signaling is non-scheduled signaling (that is the transmission of the first wireless signal in the Q1 air interface resource(s) is not indicated by the first signaling).

In one embodiment, a configuration of the L1 multiple access signature group(s) in the foregoing method avoids conflicts between two types of uplink transmissions. The two types of uplink transmissions are the uplink transmission that only occupies one air interface resource and the uplink transmission that occupies a plurality of air interface resources.

In one embodiment, based on the configuration of the L1 multiple access signature group(s), as long as the multiple access signatures included in the plurality of air interface resources are within a multiple access signature group and are multiplexed into the given timing resources, the first wireless signal receiver can combine the received wireless signals into a plurality of air interface resource(s) in the timing frequency resource to obtain a combined gain.

Specifically, according to an aspect of the disclosure, the above method further comprises:
 receiving a second control information;
 wherein the second control information is configured to indicate Q2 antenna port group(s) from the Q1 antenna port group(s); Q2 is a positive integer not greater than Q1.

In one embodiment, the method enables the user equipment to optimize the uplink transmission beam and improve the transmission efficiency for the next transmission.

In one embodiment, the method further comprises:
 receiving a second signaling;
 wherein only when the first wireless signal is not correctly decoded, the second signaling includes the second control information.

Compared to the second signaling inevitably including the second control information, the overhead of the downlink signaling can be reduced in the foregoing embodiment, and the second control information can be used for retransmission of the first wireless signal. Furthermore, if the first wireless signal is correctly decoded, the time of the next uplink transmission of the user equipment is difficult to predict. The second control information may be difficult to be used to improve transmission efficiency.

In one embodiment, the first wireless signal being correctly decoded refers that the user equipment receives an acknowledgement (ACK) for the first wireless signal.

In one embodiment, the first wireless signal being correctly decoded refers that the information bits in the second signaling indicate an ACK for the first wireless signal.

In one embodiment, the second control information is part of the second signaling, and the second signaling is downlink control information (DCI).

In one embodiment, the second signaling is cell common.

In one embodiment, the second signaling is specific to a terminal group.

Specifically, according to an aspect of the present disclosure, the above method comprises:

transmitting a second wireless signal in Q3 air interface resource(s);

wherein the first wireless signal and the second wireless signal are respectively generated based on a first bit block; the second wireless signal is transmitted by Q3 antenna port group(s); the second control information is configured to generate the Q3 antenna port group(s), the Q3 is a positive integer; any one of the Q3 antenna port group(s) includes a positive integer number of antenna ports.

The above aspects can optimize the uplink transmission beam to improve transmission efficiency.

In one embodiment, the second wireless signal includes Q3 wireless sub-signals, and the Q3 wireless sub-signals are respectively transmitted in the Q3 air interface resource(s).

In one embodiment, the Q3 is 1.

In one embodiment, the Q3 is 1, and the Q3 antenna port group(s) all merely include one antenna port.

In one embodiment, the transmission of the second wireless signal is based on a grant free.

Specifically, according to an aspect of the present disclosure, Q1 is greater than 1, and the Q1 wireless sub signals are respectively transmitted in the Q1 air interface resource(s).

In one embodiment, the Q1 air interface resource(s) share at least one multi-carrier symbol in the time domain.

In one embodiment, the Q1 air interface resource(s) completely overlap in the time domain.

In one embodiment, the Q1 air interface resource(s) completely overlap in the time domain, and the Q1 air interface resource(s) completely overlap in the frequency domain.

In one embodiment, in the foregoing aspects, the user equipment can test Q1 transmission beams simultaneously; different from space division multiplexing, the Q1 transmission beams may be spatially correlated.

In one embodiment, compared with beam sweeping, the above aspects reduce the time domain resource(s) occupied by the test beam and improve the transmission efficiency.

Specifically, according to an aspect of the present disclosure, the Q1 is greater than 1, and the Q1 wireless sub signal(s) are respectively transmitted in Q1 time domain resource(s), and any two of the Q1 time domain resource(s) do not overlap.

In one embodiment, the foregoing aspect allows a terminal having only one RF (Radio Frequency) chain to test multiple beams in a TDM (Time Division Multiplexing) manner while allowing the L1 multiple addresses and other multiple access signatures are code division multiplexed in the same time-frequency resource; a terminal can only occupy at most one of the other multiple access signatures at a given time.

Specifically, according to one aspect of the present disclosure, the first signaling indicates the first multi-access signature group from the first multiple access signature pool, the first access signature pool consists of a plurality of multiple access signatures; if the Q1 is a positive integer greater than 1, the Q1 multiple access signatures included in the Q1 air interface resource(s) belong to one of the L1 multiple access signature group(s); Q1 is 1, the Q1 multi access signature included in the Q1 air interface resource(s) is the first multi access signature pool and a multi access signature other than the L1 multi access signature group.

In one embodiment, the first multiple access signature pool is predefined, i.e., does not require signaling configuration.

In one embodiment, the first multiple access signature pool is configured by downlink signaling.

In one embodiment, any two multiple access signatures in the first multiple access signature pool are orthogonal.

Specifically, according to an aspect of the present disclosure, the above method further comprises:

receiving third signaling;

wherein the third signaling is used to indicate first time-frequency resource pool, and the time-frequency resource(s) included in any of the Q1 air interface resource(s) belongs to the first time-frequency resource pool.

The present disclosure discloses a method in a base station for wireless communication, which includes:

transmitting the first signaling;

receiving a first wireless signal in Q1 air interface resource(s);

wherein the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

Specifically, according to an aspect of the present disclosure, the above method is characterized by comprising:

transmitting second control information;

the second control information is configured to indicate Q2 antenna port group(s) from the Q1 antenna port group(s), and the Q2 is a positive integer not greater than the Q1.

Specifically, according to an aspect of the present disclosure, the above method is characterized by comprising:

receiving a second wireless signal in the Q3 air interface resource(s);

the first wireless signal and the second wireless signal are respectively generated based on a first bit block, the second wireless signal is transmitted by Q3 antenna port group(s), and the second control information is used to generate Q3 antenna port group(s), the Q3 is a positive integer, and any one of the Q3 antenna port group(s) includes a positive integer number of antenna ports.

Specifically, according to an aspect of the present disclosure, the method is characterized in that the Q1 is greater than 1, and the Q1 wireless sub-signals are respectively sent in the Q1 air interface resource(s).

Specifically, according to an aspect of the present disclosure, the method is characterized in that the Q1 is greater than 1, and the Q1 wireless sub-signals are respectively sent in Q1 time domain resource(s), and any two of the Q1 time domain resource(s) do not overlap.

Specifically, according to an aspect of the present disclosure, the method is characterized in that the first signaling indicates the L1 multiple access signature group(s) from a first multiple access signature pool, and the first multiple access signature pool is composed of multiple access signature groups; if the Q1 is a positive integer greater than 1, the Q1 multiple access signatures included in the Q1 air interface resource(s) belong to one of the L1 multiple access signature group(s); Q1 is 1, the Q1 multi access signature included in Q1 air interface resource(s) is the first multi access signature pool and a multi access signature other than the L1 multi access signature groups Specifically, according to an aspect of the present disclosure, the above method is characterized by comprising:

transmitting third signaling;

the third signaling is used to indicate first time-frequency resource pool, and the time-frequency resource included in any of the Q1 air interface resource(s) belongs to the first time-frequency resource pool.

The present disclosure discloses a user equipment for wireless communication, which includes:

a first receiver receiving a first signaling;

a first transmitter transmitting a first wireless signal in Q1 air interface resource(s);

wherein the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one embodiment, the user equipment further comprises:

a second receiver, receiving second control information;

the second control information is configured to indicate Q2 antenna port group(s) from the Q1 antenna port group(s), and the Q2 is a positive integer not greater than the Q1.

In one embodiment, the first transmitter transmits a second wireless signal in Q3 air interface resource(s); wherein the first wireless signal and the second wireless signal are respectively generated based on the first bit block, the second wireless signal is sent by the Q3 antenna port group(s), the second control information is used to generate the Q3 antenna port group(s), the Q3 is a positive integer, and any of Q3 antenna port group(s) includes a positive integer number of antenna ports.

In one embodiment, the first receiver receives a third signaling; wherein the third signaling is used to indicate the first time frequency resource pool; the time-frequency resource(s) included in any of Q1 air interface resource(s) belong to the first time frequency resource pool.

In one embodiment, the Q1 is greater than 1, and the Q1 wireless sub signals are respectively sent in the Q1 air interface resource(s).

In one embodiment, the Q1 is greater than 1, and the Q1 wireless sub signal(s) are respectively transmitted in Q1 time domain resource(s), and any two of the Q1 time domain resource(s) do not overlap.

In one embodiment, the first signaling indicates the L1 multiple access signature group(s) from a first multiple access signature pool, and the first multiple access signature pool is composed of multiple access signature groups; if the Q1 is a positive integer greater than 1, the Q1 multiple access signatures included in the Q1 air interface resource(s) belong to one of the L1 multiple access signature group(s); Q1 is 1, the Q1 multi access signature included in Q1 air interface resource(s) is the first multi access signature pool and a multi access signature other than the L1 multi access signature groups The present disclosure discloses a base station for wireless communication, which includes:

a second transmitter transmitting the first signaling;

a third receiver receiving the first wireless signal in the Q1 air interface resource(s);

wherein the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one embodiment, the foregoing base station comprises:

a third transmitter, transmitting second control information;

wherein the second control information is configured to indicate Q2 antenna port group(s) from the Q1 antenna port group(s), and the Q2 is a positive integer not greater than the Q1.

In one embodiment, the third receiver receives the second wireless signal in the Q3 air interface resource(s), wherein the first wireless signal and the second wireless signal are respectively generated based on the first bit block, the second wireless signal is sent by the Q3 antenna port group(s), the second control information is used to generate the Q3 antenna port group(s), the Q3 is a positive integer, and any of Q3 antenna port group(s) includes a positive integer number of antenna ports.

In one embodiment, the second transmitter transmits a third signaling, where the third signaling is used to indicate a first time-frequency resource pool, where the Q1 air interface resource(s) are the time-frequency resources included in any of the air interface resource(s) belong to the first time-frequency resource pool.

In one embodiment, the first receiver receives the third signaling; wherein the third signaling is used to indicate a first time-frequency resource pool, where the Q1 air interface resource(s) is(are) the time-frequency resource(s) included in any of the air interface resource(s) belong to the first time-frequency resource pool.

In one embodiment, the Q1 is greater than 1, and the Q1 wireless sub-signals are respectively sent in the Q1 air interface resource(s).

In one embodiment, the Q1 is greater than 1, and the Q1 wireless sub-signals are respectively sent in Q1 time domain resource(s), and any two of the Q1 time domain resource(s) do not overlap.

In one embodiment, the L1 multiple access signature groups from a first multiple access signature pool, and the first multiple access signature pool is composed of multiple access signature groups; if the Q1 is a positive integer greater than 1, the Q1 multiple access signatures included in the Q1 air interface resource(s) belong to one of the L1 multiple access signature group(s); Q1 is 1, the Q1 multi access signature included in Q1 air interface resource(s) is the first multi access signature pool and a multi access signature other than the L1 multi access signature groups.

In one embodiment, the present disclosure has the following advantages compared with the conventional technology:
- of avoiding the conflict between the two types of uplink transmissions, wherein one of the two type of uplink transmissions occupies one air interface resource(s) and the other one occupies multiple air interface resource(s);
- that the receiver of the first wireless signal can combine the received wireless signals into the plurality of air interface resources in the timing frequency resource(s) to obtain a combined gain;
- of reducing the overhead of downlink signaling while optimizing the uplink transmission beam to improve transmission efficiency;
- that the user equipment can test Q1 transmission beams simultaneously; unlike space division multiplexing, the Q1 transmission beams may be spatially correlated;
- compared to beam sweeping, that the transmission efficiency is improved;
- of allowing a terminal with only one radio frequency (RF) chain to test multiple beams in a time division multiplexing (TDM) manner while allowing the L1 multiple access signature groups and others the address signature is code division multiplexed in the same time-frequency resource; a terminal can only occupy at most one of the other multiple access signatures at a given time.

BRIEF DESCRIPTION OF THE DRAWINGS

Other features, objects, and advantages of the present disclosure will become more apparent from the detailed description of the accompanying drawings.

DETAILED DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
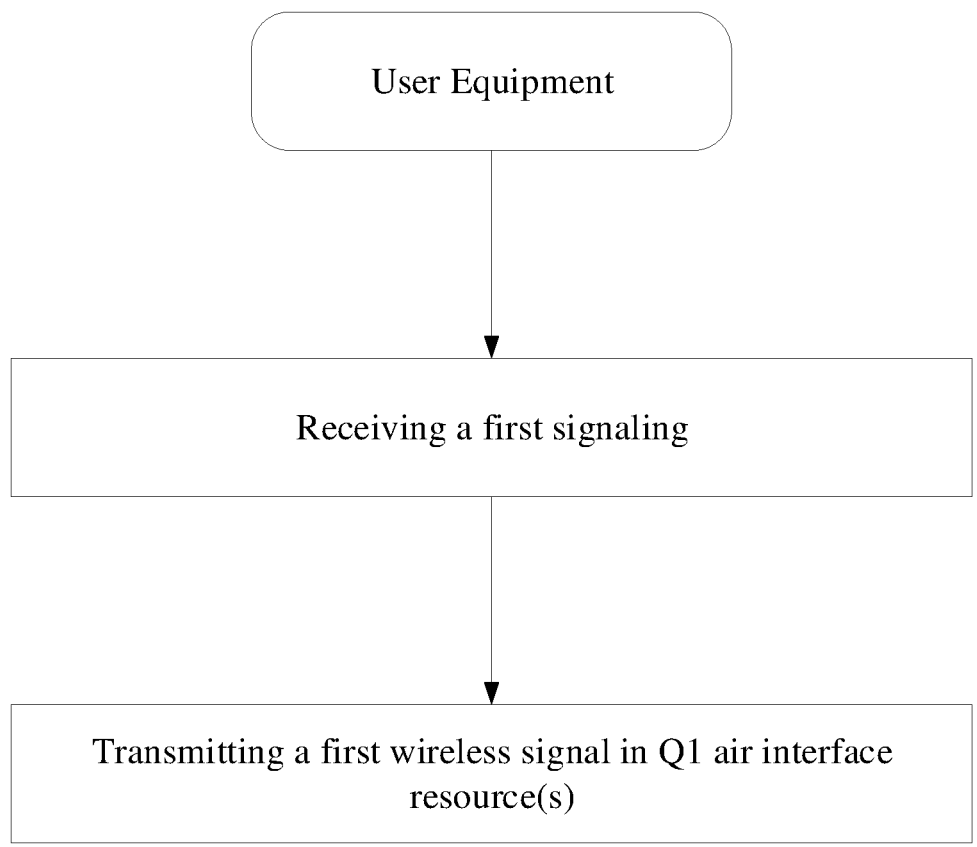
FIG. 1 shows a flowchart of a method of transmitting a first wireless signal according to one embodiment of the present disclosure.

Embodiment I shows a flowchart of a method of transmitting a first wireless signal, as shown in FIG. 1.

In Embodiment I, the user equipment (UE) receives the first signaling, and a first wireless signal is transmitted in Q1 air interface resource(s).

In Embodiment I, the first signaling is configured to determine L1 multiple access signature group(s); any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s); any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1; the Q1 multiple access signatures included in the Q1 air interface resource(s) are multiple access signatures other than the L1 multiple access signature group(s); the transmission of the first wireless signal is grant-free.

In one embodiment, the first wireless signal is transmitted in PUSCH (Physical uplink shared channel).

In one embodiment, the first wireless signal corresponds to a transport channel, which is the UL-SCH (uplink shared channel).

In one embodiment, the L1 is greater than 1.

In one embodiment, if the Q1 is a positive integer greater than 1, the Q1 air interface resource(s) including Q1 multiple access signatures belong to one of the Q1 multiple access signatures group; if the Q is 1, the Q1 air interface resource(s) including the Q1 multiple access signatures is other than the L1 multiple access signature groups.

In one embodiment, the transmission of the first wireless signal is grant-free, which comprises: the user equipment itself selects to transmit the first wireless signal in the Q1 air interface resource(s).

In one embodiment, the transmission of the first wireless signal is grant-free, which comprises: the receiver of the first wireless signal determines whether the first wireless signal is transmitted via a blind detection.

In one embodiment, blind detection s based on the DIMS (DeModulation Reference Signal) sequence detection.

In one embodiment, the blind detection is based on Cyclic Redundancy Check (CRC) bit sequence detection is brought by the first wireless signal.

In one embodiment, the first singling is common to the cell.

In one embodiment, the first signaling is common to the terminal group, the terminal group includes a plurality of terminals, the user equipment is one of the terminal groups.

In one embodiment, the first signaling is higher layer signaling.

In one embodiment, the first signaling is RRC (Radio Resource Control) layer signaling.

In one embodiment, the first signaling is SIB (System Information Block).

In one embodiment, the first signaling is PHY signaling.

In one embodiment, the first signaling explicitly indicates the L1 multiple access signature groups from the first multiple access signature pool.

In one embodiment, the first signaling implicitly indicates the L1 multiple access signature groups from the first multiple access signature pool.

In one embodiment, the first multiple access signature pool is predefined, meaning that it does not require signaling configuration.

In one embodiment, the first multiple access signature pool is allocated by the downlink signaling.

In one embodiment, the first multiple access signature pool is composed of a plurality of multiple access signatures.

In one embodiment, the number of multiple access signatures included in any two of the L1 multiple access signature groups is the same.

In one embodiment, the number of multiple access signatures included in any two of the L1 multiple access signature groups is 2.

In one embodiment, the number of multiple access signatures included in any two of the L1 multiple access signature groups is 4.

In one embodiment, the number of multiple access signatures included in at least two multiple access signature groups in the L1 multiple access signature groups is different.

In one embodiment, the number of multiple access signatures included in any of the multiple access signature groups in the L1 multiple access signature groups is an integer in $\{2, 3, 4\}$.

In one embodiment, there is no multiple access signatures that belongs to any two multiple access signatures in the L1 multiple signature groups.

In one embodiment, the time-frequency resource included in any of the Q1 air interface resource(s) is composed of multiple REs (Resource Elements).

In one embodiment, one RE occupies one multi-carrier symbol in the time domain and one sub-carrier in the frequency domain.

In one embodiment, at least two REs of the time-frequency resource(s) included in the Q1 air interface resource(s) have different sub-carrier spacing in the frequency domain.

In one embodiment, the multi-carrier symbol is an OFDM (Orthogonal Frequency Division Multiplexing) symbol.

In one embodiment, the multi-carrier symbol is an SC-FDMA (Single Carrier Frequency Division Multiplexing Access) symbol.

In one embodiment, the multi-carrier symbol is a FBMC (Filter Bank Multi-Carrier) symbol.

In one embodiment, the Q1 is greater than 1, and the Q1 air interface resource(s) share at least one multi-carrier symbol in the time domain.

In one embodiment, the Q1 is greater than 1, and the Q1 air interface resource(s) completely overlap in the time domain.

In one embodiment, the transmitter of the second broadcast signal and the transmitter of the third broadcast signal are QCL.

In one embodiment, a multiple access signature is a feature sequence, and a modulation symbol is mapped to a plurality of Res through the feature sequence.

In one embodiment, the feature sequence is a Walsh sequence.

In one embodiment, the features sequence is a pseudo-random sequence.

In one embodiment, the signature sequence is a Zadoff-Chu sequence.

In one embodiment, any two multiple access signatures in the L1 multiple access signature groups are orthogonal.

In one embodiment, the modulation symbol is a QPSK symbol.

In one embodiment, the modulation symbol is a 16QAM symbol.

In one embodiment, the modulation symbol is a 64QAM symbol.

In one embodiment, the foregoing method further includes:
  transmitting Q1 reference signals;
  wherein the Q1 reference signals are respectively transmitted by the Q1 antenna port group(s).

In one embodiment, the small-scale channel parameters experienced by the Q1 reference signals are respectively configured to infer small-scale channel parameters experienced by the Q1 wireless sub-signals.

In one embodiment, any one of the Q1 wireless sub-signals is outputted after the first bit block is sequentially subjected to passing through the channel coding, the scrambling, the modulation mapper, the layer mapper, the precoding, the code division multiplexing, the resource element mapper, and the broadband symbol generation.

In one embodiment, any one of the Q1 wireless sub-signals is outputted after the first bit block is sequentially subjected to passing through the channel coding, the scrambling, the modulation mapper, the layer mapper, the transform precoder configured to generate the complex value signal, the precoding, the code division multiplexing, the resource element mapper, and the broadband symbol generation.

In one embodiment, the Q1 wireless sub signal(s) can be combined and received by the receiver.

In one embodiment, in addition to the precoding, the Q1 wireless sub-signals carry exactly the same information.

In one embodiment, the first wireless signal is assumed to be transmitted by one terminal, including: the transmission power of the first wireless signal is independent of the Q1.

In one embodiment, the first wireless signal is assumed to be transmitted by one terminal, including: the transmitting power of each of the Q1 wireless sub-signals related to the Q1.

In one embodiment, the first wireless signal is assumed to be transmitted by one terminal, and the MCS (Modulation Coding Status) of the first wireless signal is selected based on the assumption that the Q1 wireless sub-signals are combined and received.

In one embodiment, the first wireless signal is assumed to be transmitted by one terminal including: the transmission power of the first wireless signal is selected based on the assumption that the Q1 wireless sub-signals are combined and received.

In one embodiment, the first wireless signal is assumed to be transmitted by one terminal including: the receiver of the first wireless signal performs combined reception on the Q1 wireless sub-signals.

In one embodiment, the merge reception is based on MRC (Maximum Ratio Combination).

In one embodiment, the combined reception is based on the combination of soft bits.

In one embodiment, the transmit power of the first wireless signal is equal to the sum of a first power component and a second power component, the first power component is configured by the higher layer signaling, and the second power component and path loss are directly proportional.

In one embodiment, the transmission powers of the Q1 wireless sub-signals are all equal.

In one embodiment, the first power component comprises power ramping.

Embodiment II

Figure 2:
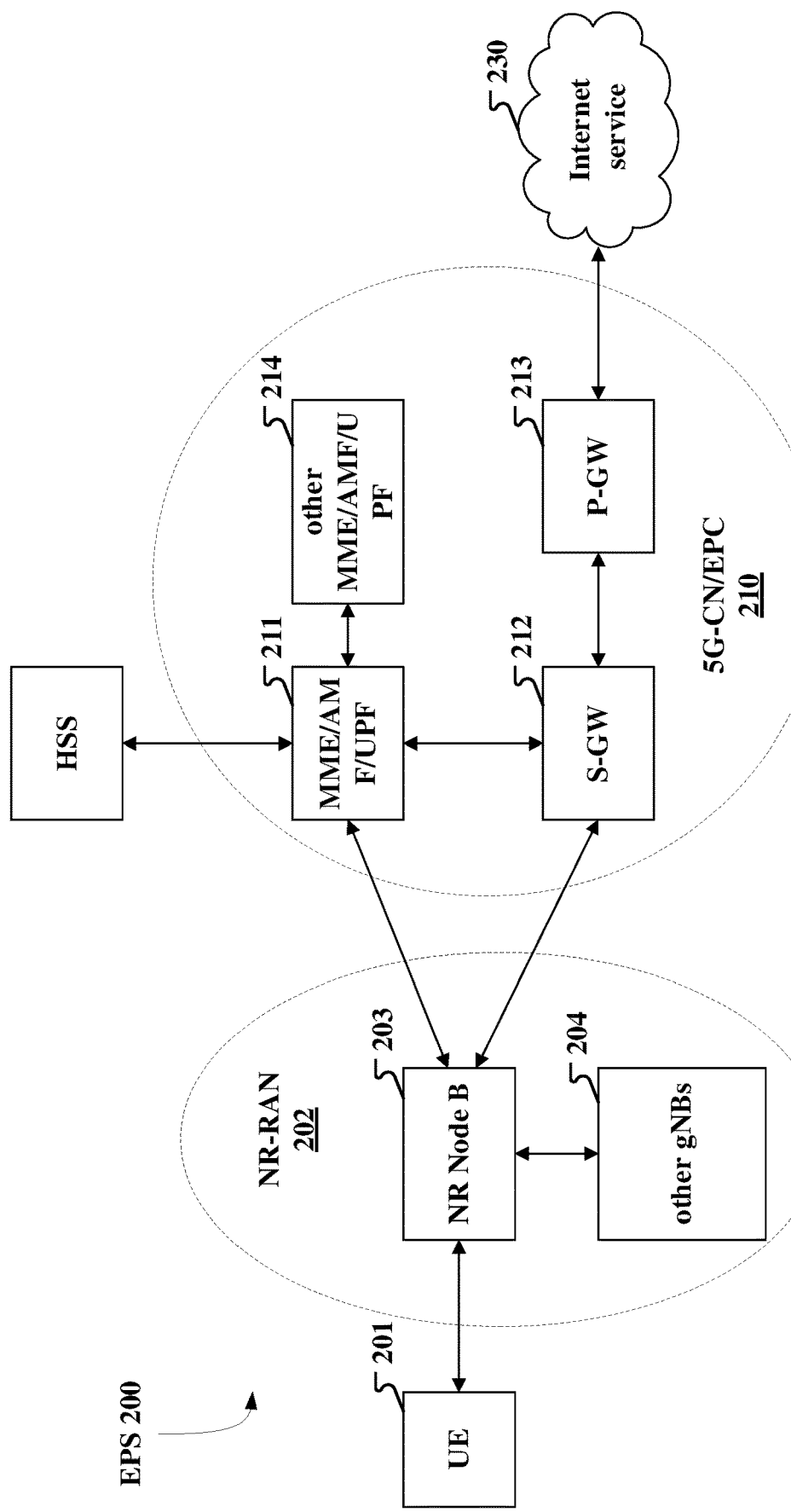
FIG. 2 shows a schematic diagram of network architecture according to one embodiment of the present disclosure.

Embodiment II shows a schematic diagram of network architecture, as shown in FIG. 2.

Embodiment II illustrates a schematic diagram of a network architecture according to the present discloses, as shown in FIG. 2.

FIG. 2 describes a system network structure 200 of NR 5G, LTE (long-term evolution) and LTE-A (long-term evolution advanced). The network architecture 200 of NR 5G or LTE may be referred to as an EPS (evolve packet system) 200 or some other suitable terminology. The EPS 200 may include one or more UEs 201, NG-RAN (radio access network) 202, 5G-CN (core network)/EPC (evolved packet core) 210, HSS(Home Subscriber Server) 220 and the internet service 230. EPS may be interconnected with other access networks, but for the sake of simplicity, these entities/interfaces are not shown. As shown in FIG. 2, the EPS provides the packet switching services. Those skilled in the art would readily appreciate that the various concepts presented throughout this disclosure can be extended to networks or other cellular networks that provide circuit switched services. The NG-RAN includes an NR Node B (gNB) 203 and other gNBs 204. The gNB 203 provides user and control plane protocol termination for the UE 201. The gNB 203 can be connected to other gNBs 204 via an Xn interface (eg, a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 203 provides the UE201 with an access point to the 5G-CN/EPC 210. In the embodiment, the UE201 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, Video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 includes MME/AMF/UPF 211, other MME (Mobility Management Entity)/AMF (Authentication Management Field)/UPF (User Plane Function) 214 An S-GW (Service Gateway) 212 and a P-GW (Packet Date Network Gateway) 213. The MME/AMF/UPF 211 is a control node that handles signaling between the UE 201 and the 5G-CN/EPC 210. In general, MME/AMF/UPF 211 provides bearer and connection management. All User IP (Internet Protocol) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IMS (IP Multimedia Subsystem), and a PS Streaming Service (PSS).

In a sub-embodiment, the UE 201 corresponds to the user equipment in this disclosure.

In a sub-embodiment, the UE 201 corresponds to the terminal in this disclosure.

In a sub-embodiment, the gNB203 corresponds to the base station in this disclosure.

In a sub-embodiment, the UE201 supports the data transmission in the unlicensed spectrum in a wireless communication.

In a sub-embodiment, the gNB203 supports the data transmission in the unlicensed spectrum in a wireless communication.

In a sub-embodiment, the Non-Orthogonal Multiple Access (NOMA) wireless communication is supported by the UE201.

In a sub-embodiment, the NOMA wireless communication is supported by the gNB203.

In a sub-embodiment, the grant free uplink transmission is supported by the UE 201.

In a sub-embodiment, the grant free uplink transmission is supported by the gNB203.

In a sub-embodiment, the competition uplink transmission is supported by the UE 201.

In a sub-embodiment, the competition uplink transmission is supported by the gNB203.

In a sub-embodiment, the beamforming uplink transmission is supported by the UE 201.

In a sub-embodiment, the beamforming uplink transmission is supported by the gNB203.

In a sub-embodiment, the Massive-MIMO uplink transmission is supported by the UE201.

In a sub-embodiment, the Massive-MIMO uplink transmission is supported by the gNB203.

Embodiment III

Figure 3:
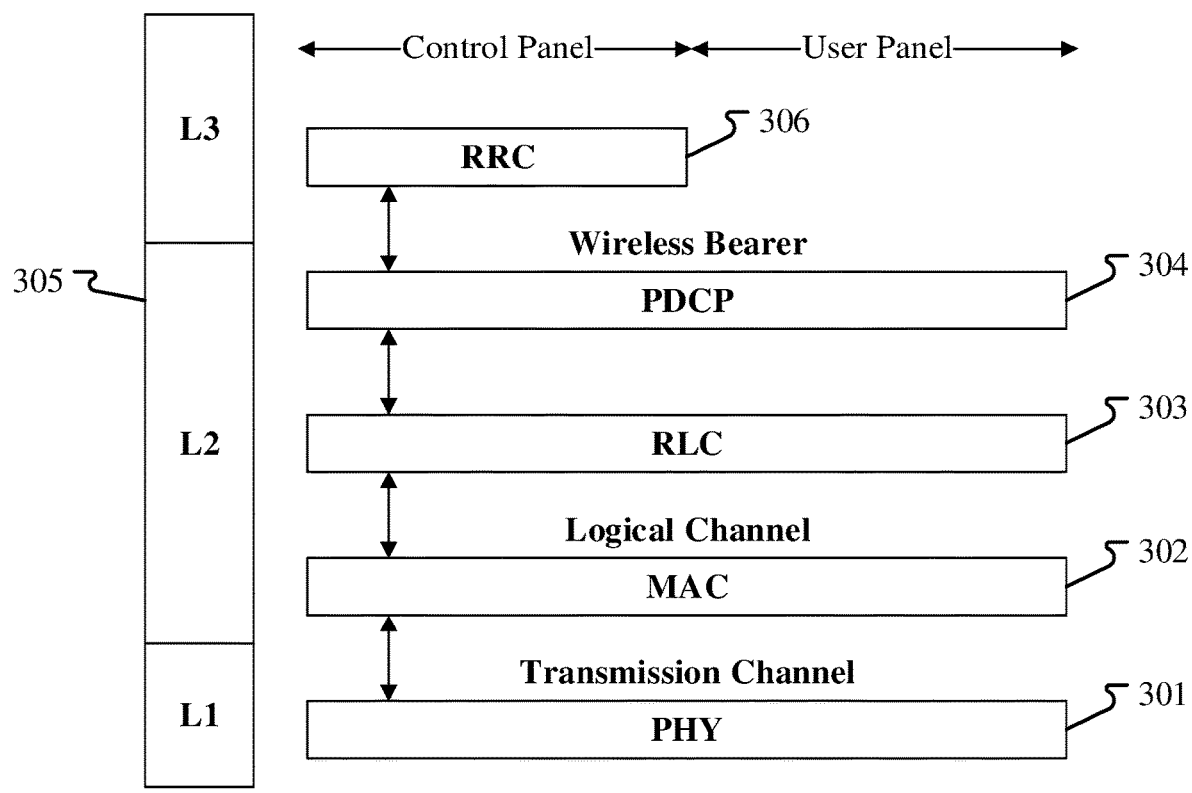
FIG. 3 shows a schematic diagram of a wireless protocol architecture of a user plane and a control plane according to one embodiment of the present disclosure.

Embodiment III shows a schematic diagram of a wireless protocol architecture of a user plane and a control plane according to the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request (HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the wireless protocol architecture for the UE and gNB is substantially the same for the physical layer 301 and the L2 layer 305, but there is no header compression function for the control plane. The control plane also includes an RRC (Wireless Resource Control) sublayer 306 in Layer 3 (L3 layer). The RRC sublayer 306 is responsible for obtaining wireless resources (i.e. wireless bearers) and configuring the lower layer using RRC signaling between the gNB and the UE.

In one embodiment, the wireless protocol architecture of FIG. 3 is applicable to the user equipment in this disclosure.

In one embodiment, the wireless protocol architecture of FIG. 3 is applicable to the base station in this disclosure.

In one embodiment, the first wireless signal in the present disclosure is generated by the PHY 301.

In one embodiment, the second wireless signal in the present disclosure is generated by the PHY 301.

In one embodiment, the first bit block in the present disclosure is passed to the PHY 301 by the L2 layer.

In one embodiment, the first bit block in the present disclosure is passed to the PHY 301 by the MAC layer 302.

In one embodiment, a first signaling in the present disclosure is generated within the RRC306.

In one embodiment, a second signaling in the present disclosure is generated within the PHY 301.

In one embodiment, the second control information in the present disclosure is generated by the PHY 301.

In one embodiment, the third signaling in the present disclosure is generated within the RRC306.

In one embodiment, the Q1 reference signals in the present disclosure are generated by the PHY 301.

Embodiment IV

Figure 4:
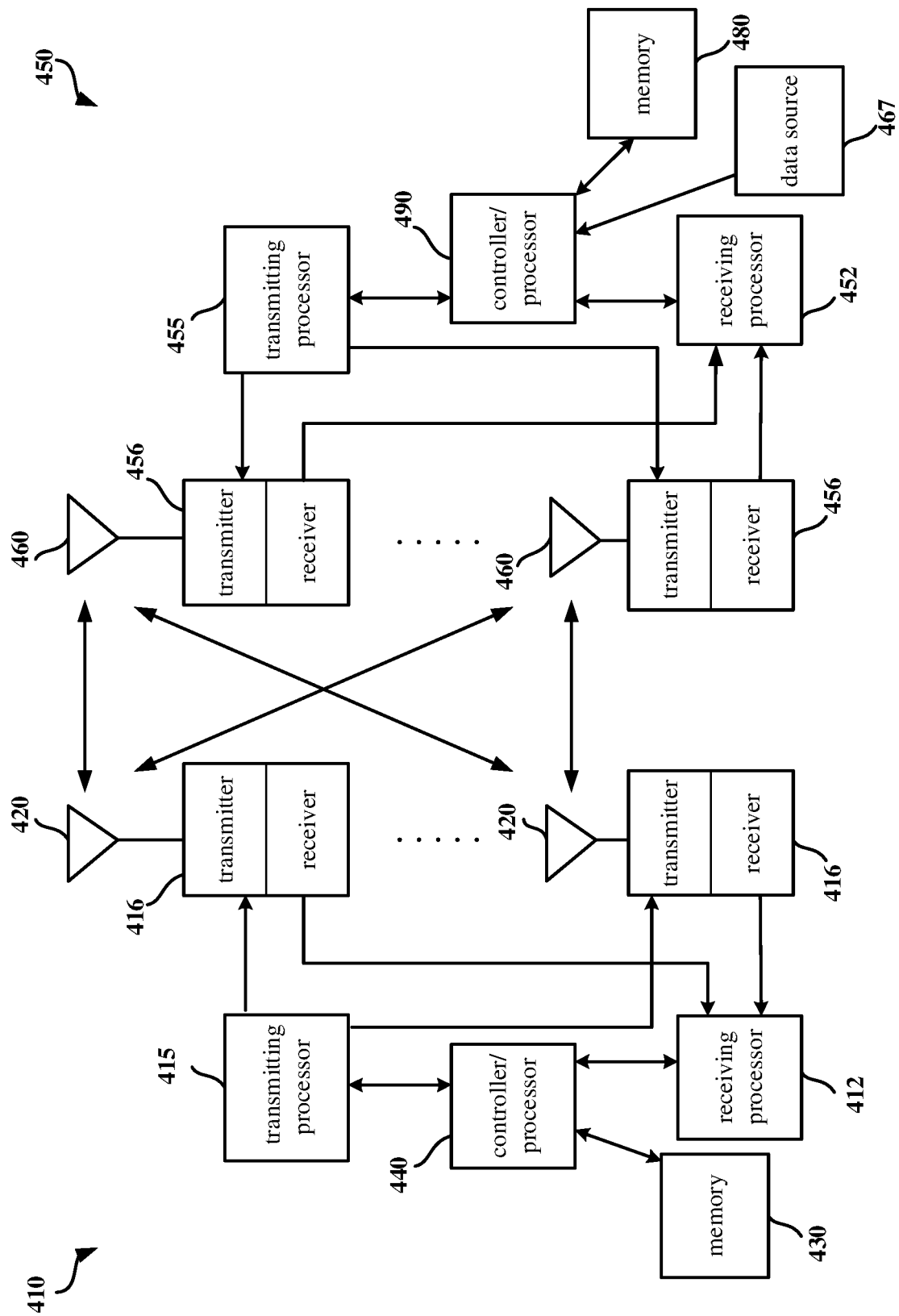
FIG. 4 shows a schematic diagram of base station equipment and user equipment according to one embodiment of the present disclosure.

Embodiment IV shows a schematic diagram of base station equipment and user equipment according to the present disclosure, as shown in FIG. 4. FIG. 4 is a block diagram of a gNB 410 in communication with a UE 450 in an access network.

The base station equipment 410 includes a controller/processor 440, a memory 430, a receiving processor 412, a transmitting processor 415, the transmitter/receiver 416 and the antenna 420.

The user equipment 450 includes a controller/processor 490, a memory 480, a data source 467, a transmitting processor 455, a receiving processor 452, a transmitter/receiver 456, and an antenna 460.

In the uplink (UL) transmission, the processing related to the base station equipment (410) includes:

- a receiver 416, which receives a wireless frequency signal through its respective antenna 420, converts the received RF signal into a baseband signal and provides the baseband signal to the receiving processor 412;
- a receiving processor 412, which implements for the L1 layer (i.e. physical layer) of the various signal processing functions including receiving a multi-antenna reception, demodulation, descrambling, despreading, deinterleaving, channel decoding and physical layer control signaling extraction, etc.
- a controller/processor 440, which implements L2 layer functions and is associated with a memory 430 that stores program codes and data;
- the controller/processor 440, which provides demultiplexing, packet reassembly, deciphering, header decompression, control signal processing between logical channels and transports to recover the upper layer packet from UE; upper layer packets from controller/processor 440 can be provided to the core network;
- the controller/processor 440, which determines that the target wireless signals may be occupied by a target air interface resource, and transmits the result to the reception processor 412; determining whether or not the target uplink wireless signal occupies the target air interface resource by blind detection; the target wireless signal includes at least one of the first wireless signal in the application (the target air interface resources correspond to the Q1 air interface resource(s) in the present disclosure) or the second wireless signal (the target air interface resource(s) correspond to the Q3 air interface resource(s) in the present disclosure).

In UL transmission, the processing related to the user equipment 450 includes:

a data source 467, that provides the upper layer packet to a controller/processor 490. The data source 467 represents all protocol layers above the L2 layer;

a transmitter 456, which transmits wireless frequency signals by its respective antenna 460, converts a baseband signal to the radio frequency (RF) signal, and provides the RF signal to the respective antenna 460;

a transmit processor 455, which implements for the L1 layer (i.e. physical layer) of the various signal processing functions including channel coding, scrambling code, code division multiplexing, interleaving, modulation, and multi-antenna transmission and the like;

a controller/processor 490, which implements header compression, encryption, packet segmentation and reordering, and multiplexing between logical and transport channels based on wireless resource allocation of the gNB 410, and implements L2 layer functions for the user plane and the control plane.

the controller/processor 490 is also responsible for HARQ operations, retransmission of lost packets, and the signaling to the gNB 410;

the controller/processor 490, which itself determines the target wireless signal occupied the air interface resource(s), and transmits the result to the transmit processor 455; the target wireless signal of the present disclosure includes at least one of the first wireless signal (the target air interface resource(s) correspond to the Q1 air interface resource(s) in the present disclosure) or the second wireless signal (the target air interface resource(s) correspond to the Q3 air interface resource(s)).

In the downlink (DL) transmission, the processes relate to the base station equipment, comprises:

a controller/processor 440, which provides header compression, encryption, packet segmentation and reordering, and multiplexing and demultiplexing between logical and transport channels when upper layer packet arrives, for implanting L2 layer protocol of the user plane and the control plane, the upper layer packet may include data or control information, such as downlink shared channel (DL-SCH);

the controller/processor 440, which is associated with a memory 430 that stores program codes and data, the memory 430 may be a computer-readable medium;

the controller/processor 440, which includes the scheduling unit for transmitting a demand, the scheduling unit is configured for scheduling the air interface resource(s) corresponding to the requirements of transmission and schedule;

the controller/processor 440, which determines to perform the transmission of downlink signaling/data to be transmitted; and transmits the result to the transmission processor 415;

the transmitting processor 415, which receives the output bit stream of the controller/processor 440, and implements for the L1 layer (i.e. physical layer) of the various signal processing functions including coding, interleaving, scrambling, modulation, precoding, power control/allocation and physical layer control signaling (including PBCH, PDCCH,PHICH,PCFICH, reference signal) generation, etc.;

the transmitter 416, which is configured for converting the baseband signals provided by the transmit processor 415 into radio frequency signals and transmitting the signals via the antenna 420; each transmitter 416 samples the respective input symbol stream to obtain respective sampled signal streams. Each transmitter 416 further process the respective sample streams (e.g. digital to analog conversion, amplification, filtering, upconversion, etc.) to obtain a downlink signal.

In the DL transmission, the processing related to the user equipment (450) may include:

a receiver 456, which is configured for converting the radio frequency signal received to a baseband signal through the antenna 460, and the based signal is provided to the receiving processor 452;

a receiving processor 452, which implements for the L1 layer (i.e. physical layer) of the various signal processing functions including multi-antenna reception, demodulation, descrambling, deinterleaving, decoding, and physical layer control signaling extraction;

a controller/processor 490, which receives the bit stream output by the receive processor 452, provides header decompression, decryption, packet segmentation and reordering, and multiplexing and demultiplexing between the logical and transport channels to implement L2 layer protocol for user plane and control plane;

the controller/processor 490, which is associated with a memory 480 that stores program codes and data, and the memory 480 may be a computer-readable medium.

In one sub-embodiment, the UE 450 includes: at least one processor and at least one memory, the at least one memory including computer program codes; the at least one memory and the computer program code are configured to operate with the processor together, the UE 450 receives at least the first signaling, and transmits a first wireless signal in Q1 air interface resource(s). Specifically, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one sub-embodiment, the UE 450 includes a memory storing a computer readable instruction program, which generates an action when executed by at least one processor, and the action comprises: receiving the first signaling; transmitting the first wireless signal in the Q1 air interface resource(s). Specifically, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one sub-embodiment, the gNB 410 device includes: at least one processor and at least one memory, the at least one memory includes computer program codes; the at least one memory and the computer program code are configured to be operated with at least one processor together. The gNB410 device at least: transmitting the first signaling; and the third receiver: receiving the first wireless signal in the Q1 air interface resource(s). Specifically, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In one sub-embodiment, the gNB 410 includes: a memory storing a computer readable instruction program, which generates an action when executed by at least one processor, and the action comprises: transmitting the first signaling; the third receiver: receiving the first wireless signal in the Q1 air interface resource(s). Specifically, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

In a sub-embodiment, the UE 450 corresponds to the user equipment in this disclosure.

In a sub-embodiment, gNB 410 corresponds to the base station in this disclosure.

In a sub-embodiment, the controller/processor 490 is configured to generate the first bit block in this disclosure.

In a sub-embodiment, the controller/processor 490 is configured to determine the time frequency resource(s) occupied by the second signaling in the present disclosure.

In a sub-embodiment, at least two of antenna 460, the transmitter 456, the transmitting processor 455, and the controller/processor 490 are configured to transmit the first wireless signal.

In one sub-embodiment, at least two of antenna 460, the receiver 456, the receiving processor 452, and the controller/processor 490 are configured to receive the second control information.

In a sub-embodiment, at least two of antenna 460, the transmitter 456, the transmitting processor 455, and the controller/processor 490 are configured to transmit the second wireless signal.

In one sub-embodiment, at least two of antenna 460, the receiver 456, the receiving processor 452, and the controller/processor 490 are configured to receive the first signaling.

In a sub-embodiment, at least two of antenna 460, the transmitter 456, the transmitting processor 455, and the controller/processor 490 are configured to receive the third signaling In one sub-embodiment, at least two of antenna 460, the receiver 456, the receiving processor 452, and the controller/processor 490 are configured to receive Q1 reference signals.

In one sub-embodiment, the controller/processor 440 is configured to receive the first wireless signal, and configured to determine the transmission of second control information, and configured to receive the second wireless signal.

In one sub-embodiment, at least two of antenna 420, the receiver 416, the receiving processor 412, and the controller/processor 440 are configured to receive the first wireless signal.

In a sub-embodiment, at least two of antenna 420, the transmitter 416, the transmitting processor 415, and the controller/processor 440 are configured to transmit the second control information.

In a sub-embodiment, at least two of antenna 420, the transmitter 416, the receiving processor 412, and the controller/processor 440 are configured to receive the second wireless signal.

In a sub-embodiment, at least two of antenna 420, the receiver 416, the transmitting processor 415, and the controller/processor 440 are configured to transmit the first signaling.

In a sub-embodiment, at least two of antenna 420, the receiver 416, the transmitting processor 415, and the controller/processor 440 are configured to transmit the third signaling in the third air interface pool.

In a sub-embodiment, at least two of antenna 420, the receiver 416, the transmitting processor 415, and the controller/processor 440 are configured to transmit the Q1 reference signals.

Embodiment V

Figure 5:
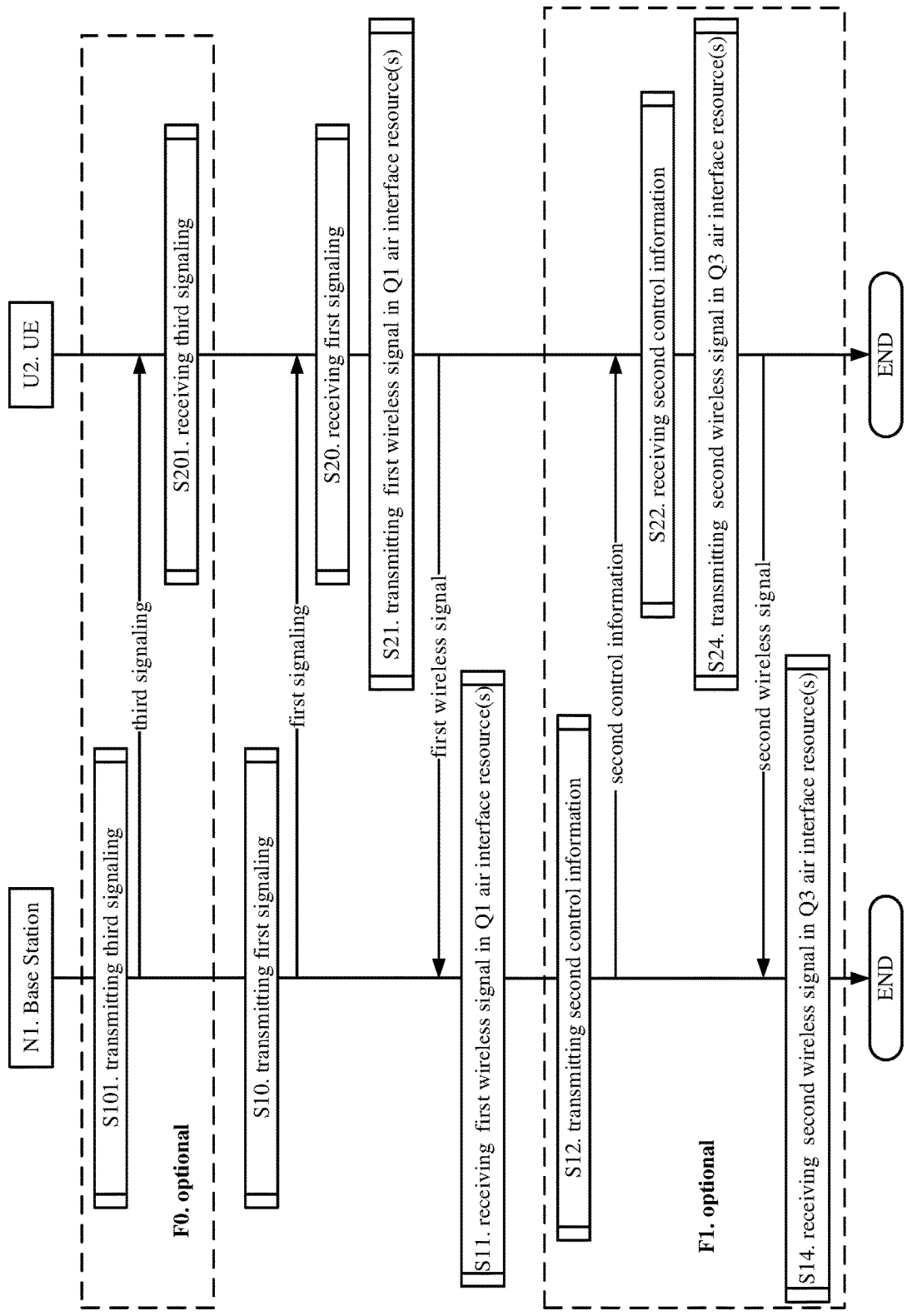
FIG. 5 shows a flow chart of an uplink transmission according to one embodiment of the present disclosure.

Embodiment V illustrates a flow chart of an uplink transmission, as shown in FIG. 5. In FIG. 5, the base station N1 is a maintenance base station of the serving cell of the user equipment U2. In the figure, the steps in the box identified as F0 and the steps in the box identified as F1 are optional, respectively.

For the base station N1, in step S101, transmitting a third signaling; in step S10, transmitting a first signaling; in step S11, receiving a wireless signal in Q1 air interface resource(s); in step S12, transmitting a second control information; in step S13, receiving a second wireless signal in Q3 air interface resource(s).

For the user equipment U2, in step S201, receiving the third signaling; in step S20, receiving a first signaling; in step S21, transmitting a first wireless signal in Q1 air interface resource(s); in step S22, receiving a second control information; in step S23, transmitting a second wireless signal in the Q3 air interface resource(s).

In Embodiment V, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free; the second control information is configured to indicate Q2 antenna port group(s) from the Q1 antenna port group(s), the Q2 is a positive integer not greater than the Q1. the first wireless signal and the second wireless signal are respectively generated based on a first bit block, the second wireless signal is transmitted by Q3 antenna port group(s), the second control information is configured to generate the Q3 antenna port group(s), the Q3 is a positive integer, any one of the Q3 antenna port group(s) includes a positive integer number of antenna ports; the third signaling is configured to indicate the first time-frequency resource pool, and the time-frequency resource(s) included in any of the Q1 air interface resource(s) belongs to the first time-frequency resource pool.

In one embodiment, the Q2 is 1.

In one embodiment, the Q2 is configurable.

In one embodiment, the number of antenna ports included in any two of the Q1 antenna port groups is the same.

In one embodiment, the number of antenna ports included in at least two of antenna port group(s) is different.

In one embodiment, the number of antenna ports included in all antenna port group(s) in the Q1 antenna port group(s) is 1.

In one embodiment, how to select the Q3 antenna port group(s) according to the second control information is related to the user equipment U2 (i.e. the standard may not be defined).

In one embodiment, the Q3 is equal to the Q2, and the Q3 antenna port group(s) is (are) the Q2 antenna port group(s).

In one embodiment, both Q3 and Q2 are 1.

In one embodiment, the Q3 is smaller than the Q2, and the user equipment itself selects the Q3 antenna port group(s) from the Q2 antenna port group(s).

In one embodiment, the user equipment itself determines to select Q3 antenna port group(s) from the Q2 antenna port group(s) or outside the Q2 antenna port group(s) according to the second control information In one embodiment, the first bit block is a TB (Transport Block).

In one embodiment, the first bit block is a C B (Code Block).

In one embodiment, the first bit block includes a plurality of sequentially arranged bits.

In one embodiment, the first wireless signal is outputted after the first bit block is sequentially subjected to passing through the channel coding, the scrambling, the modulation mapper, the layer mapper, the precoding, the code division multiplexing, the resource element mapper, and the broadband symbol generation.

In one embodiment, the second wireless signal is outputted after the first bit block is sequentially subjected to passing through the channel coding, the scrambling, the modulation mapper, the layer mapper, the precoding, the code division multiplexing, the resource element mapper, and the broadband symbol generation.

In one embodiment, the first time-frequency resource pool is composed of multiple REs.

In one embodiment, at least two REs in the first time-frequency resource pool have different sub-carrier spacings in the frequency domain.

In one embodiment, the first time-frequency resource pool is reserved for non-granted uplink transmissions.

In one embodiment, the time domain resource occupied by the second wireless signal is associated with a time domain resource occupied by the first wireless signal.

In one embodiment, multiple access signatures corresponding to the Q3 air interface resource(s) is a subset of the multiple access signatures corresponding to the Q1 air interface resource(s).

In one embodiment, the time domain resource occupied by the second control information is associated with a time domain resource occupied by the first wireless signal.

In one embodiment, the time-frequency resource occupied by the second wireless signal is associated with a time-frequency resource occupied by the first wireless signal.

In one embodiment, the time-frequency resource occupied by the second control information is associated with a time-frequency resource occupied by the first wireless signal.

Embodiment VI

Figure 6:
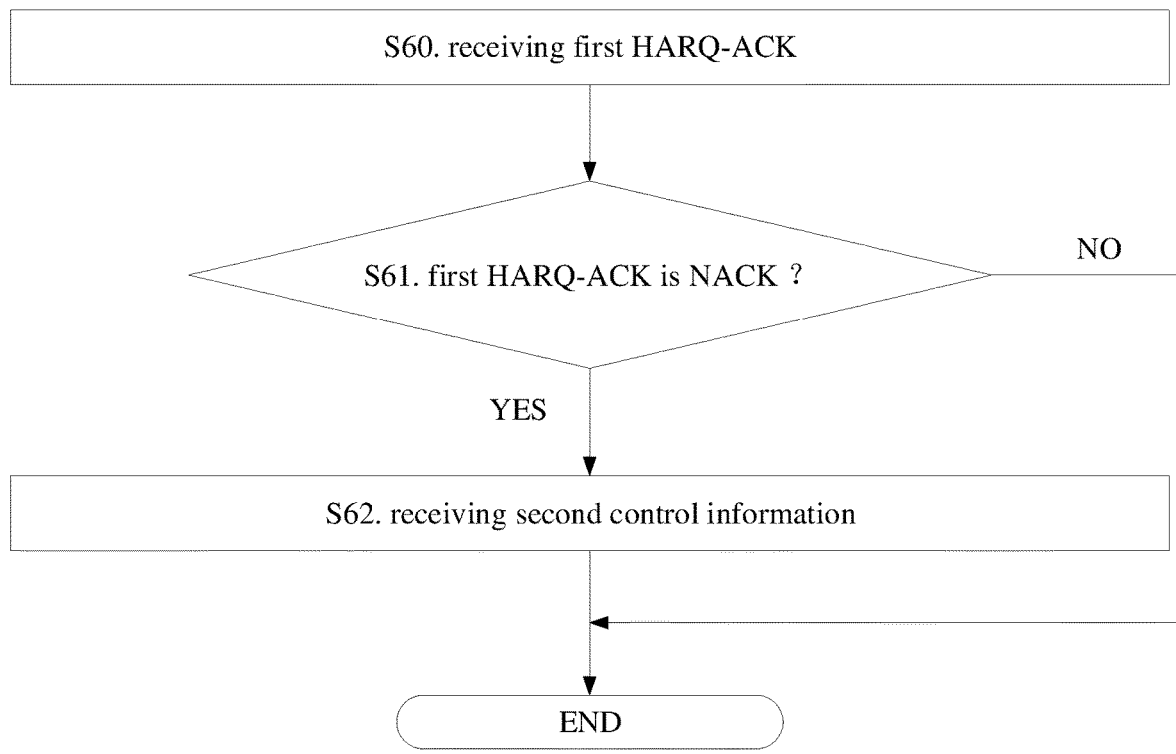
FIG. 6 shows a schematic diagram of receiving the second control information according to one embodiment of the present disclosure.

Embodiment VI illustrates a schematic diagram of receiving the second control information, as shown in FIG. 6. The steps in FIG. 6 are performed on the user equipment side.

In step S60, the user equipment receives a first HARQ (hybrid automatic repeat request)-ACK, the first HARQ-ACK indicates whether the first wireless signal (first bit block) is correctly decoded; in the step 61, determining whether step S62 is performed, and if the first HARQ-ACK is NACK, the second control information is received in step S62; if the first HARQ-ACK is not NACK (YES), directly jumping to the end.

In one embodiment, the ending that is the user equipment abandons to receive the second control information.

In one embodiment, the ending that is the user equipment assumes that the base station does not transmit the second control information.

In one embodiment, the first HARQ-ACK belongs to the second signaling.

In one embodiment, if the first HARQ-ACK is a NACK, the second signaling includes the second control information; if the first HARQ-ACK is an ACK, the second signaling does not include the second control information.

In one embodiment, the second signaling is a DCI.

In one embodiment, the second signaling is associated with the first air interface resource pool, that is, all terminals that transmit wireless signals in the first air interface resource pool receive the second signaling to obtain corresponding HARQ-ACKs; the first air interface resource pool includes the Q1 air interface resource pools in this disclosure.

In one embodiment, the steps in FIG. 6 being peer-to-peer operations at the base station includes: the base station transmits the first HARQ, the first HARQ-ACK indicates whether the first wireless signal (the first bit block) is correctly decoded; if the first HARQ-ACK is a NACK, the base station transmits the second control information; if the first HARQ-ACK is an ACK, the base station does not transmit the second control information.

Embodiment VII

Figure 7:
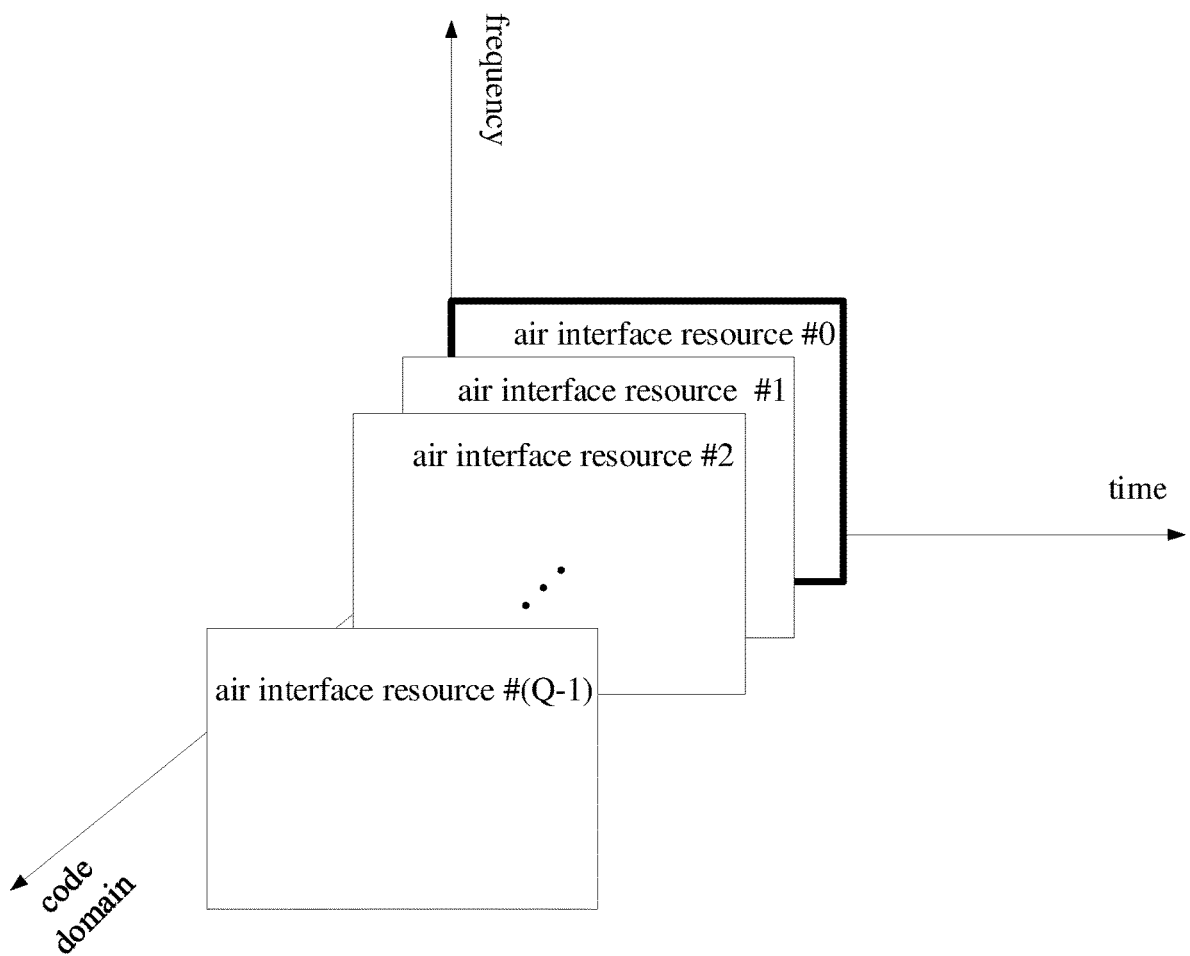
FIG. 7 shows a schematic diagram of the Q air interface resource(s) according to one embodiment of the present disclosure.

Embodiment VII illustrates a schematic diagram of the Q air interface resource(s), as shown in FIG. 7.

In Embodiment VII, the time-frequency resources occupied by the air interface resources #0, #1, . . . , #(Q−1) belong to the same time-frequency resource block—as indicated by the thick line in FIG. 7; the air interface resources #0, #1, . . . , #(Q−1) respectively correspond the Q different code domain resources, which are the multiple access signatures.

In one embodiment, the first multiple access signature pool is composed of the Q different code domain resources in the present disclosure.

The air interface resources #0, #1, . . . , #(Q−1) occupy the same RE in the same time-frequency resource block.

In one sub-embodiment of the foregoing embodiment, the air interface resources #0, #1, . . . , #(Q−1) occupy the same time-frequency resource block except for the RE of the RS (Reference Signal).

In one embodiment, the Q air interface resources share at least one multi-carrier symbol in the time domain.

In one embodiment, the Q air interface resources completely overlap in the time domain.

In one embodiment, the Q air interface resources completely overlap in the time domain, and the Q1 air interface resources completely overlap in the frequency domain.

In one embodiment, at least two air interface resources in the air interface resources #0, #1, . . . , #(Q−1) occupy different REs in the same time-frequency resource block.

The above embodiment is applicable to a scheme similar to SCMA (Sparse Code Multiple Access).

In one embodiment, the code domain resources included in the air interface resources #0, #1, . . . , #(Q−1) constitute the first multiple access signature pool in the present disclosure, and the air interface resources #0, #1, . . . , #(Q−1) constitute a first air interface resource pool, and the Q is greater than the Q1, and the Q1 air interface resources in the present disclosure are a subset of the first air interface resource pool.

In one embodiment, the Q3 air interface resources in the application area subset of the air interface resources #0, #1, . . . , #(Q−1), and the Q is greater than Q3.

In one embodiment, the Q is equal to Q1, and the air interface resources #0, #1, . . . , #(Q−1) are the Q1 air interface resources in the present disclosure.

In one embodiment, the Q modulation symbols are respectively mapped to the REs occupied by the air interface resources #0, #1, . . . , #(Q−1) by multiplying the Q different code domain resources, and the Q modulation symbols implements the code division multiplexing.

Embodiment VIII

Figure 8:
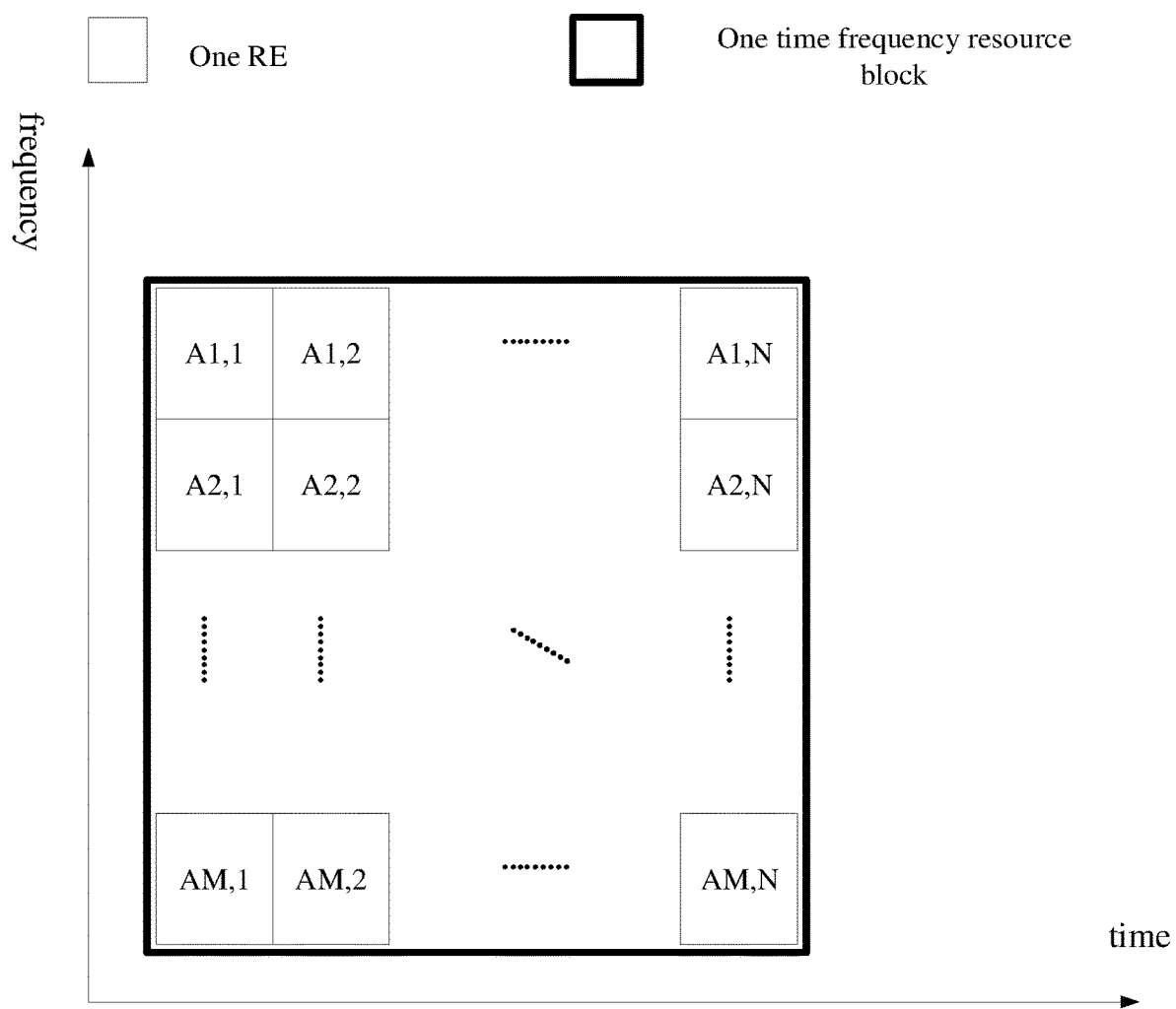
FIG. 8 shows a schematic diagram of an air interface resource(s) occupied the frequency resource(s) according to one embodiment of the present disclosure.

Embodiment VIII illustrates a schematic diagram of an air interface resource occupied the frequency resource, as shown in FIG. 8. In FIG. 8, the small squares represent a RE, and the thick squares represent a time-frequency resource block.

In Embodiment VIII, the time-frequency resource block occupies M sub-carriers in the frequency domain, and occupies N multi-carrier symbols in the time domain, and the time-frequency resources occupied by one air interface resource belong to the time-frequency resource block.

In one embodiment, modulation symbols in a plurality of air interface resources are mapped into the time-frequency resource block by means of code division multiplexing.

In one embodiment, for each of the plurality of air interface resources, all the elements in the corresponding multiple access signature are multiplied by the modulation symbol and then mapped in the RE of the time-frequency resource block according to the sorting principle of the time domain as first, and the frequency domain as second.

In one embodiment, for each of the plurality of air interface resource(s), all the elements in the corresponding multiple access signature are multiplied by the modulation symbol and then mapped in the RE of the time-frequency resource block according to the sorting principle of the time domain as first, and the frequency domain as second.

In one embodiment, all elements in the multiple access signature included in an air interface resource are multiplied by a modulation symbol according to $A_{M,1}$, $A_{M-1,\ 1}$, $A_{M-2,1}$, . . . , $A_{1,1}$, $A_{M,\ 2}$, $A_{M-1,2}$, $A_{M-2,2}$, . . . , $A_{M,\ N}$, $A_{M-N,1}$, $A_{M-N,1}$, . . . , $A_{1,\ N}$ are sequentially mapping in the time-frequency within the RE of the resource block, where it avoids to occupy REs (if any) that are not allocated to the air interface resources.

In one embodiment, all elements in the multiple access signature included in an air interface resource are multiplied by a modulation symbol according to $A_{M,1}$, $A_{M,2}$, $A_{M,3}$, ..., $A_{M,N}$, $A_{M-1,1}$, $A_{M-1,2}$, $A_{M-1,3}$, ..., $A_{M-1,N}$, $A_{1,1}$, $A_{1,2}$, ..., $A_{1,N}$ are sequentially mapped to the time-frequency resource within the RE of the block, where it avoids to occupy REs (if any) that are not allocated to the air interface resources.

In one embodiment, the REs that are not allocated to the air interface resource(s) is (are) allocated to a DMRS (De-Modulation Reference Signal).

In one embodiment, the REs that are not allocated to the air interface resource(s) is (are) allocated to an SRS (Sounding Reference Signal).

In one embodiment, the RE that is not allocated to the air interface resource is allocated to a PUCCH (Physical Uplink Control Channel).

In one embodiment, the time-frequency resource block belongs to a PRB (Physical Resource Block).

In one embodiment, the time-frequency resource block belongs to a PRBP (Physical Resource Block Pair).

In one embodiment, the M is no greater than 12 and the N is no greater than 14.

In one embodiment, the M and the N are equal to 12 and 14, respectively.

Embodiment IX

Figure 9:
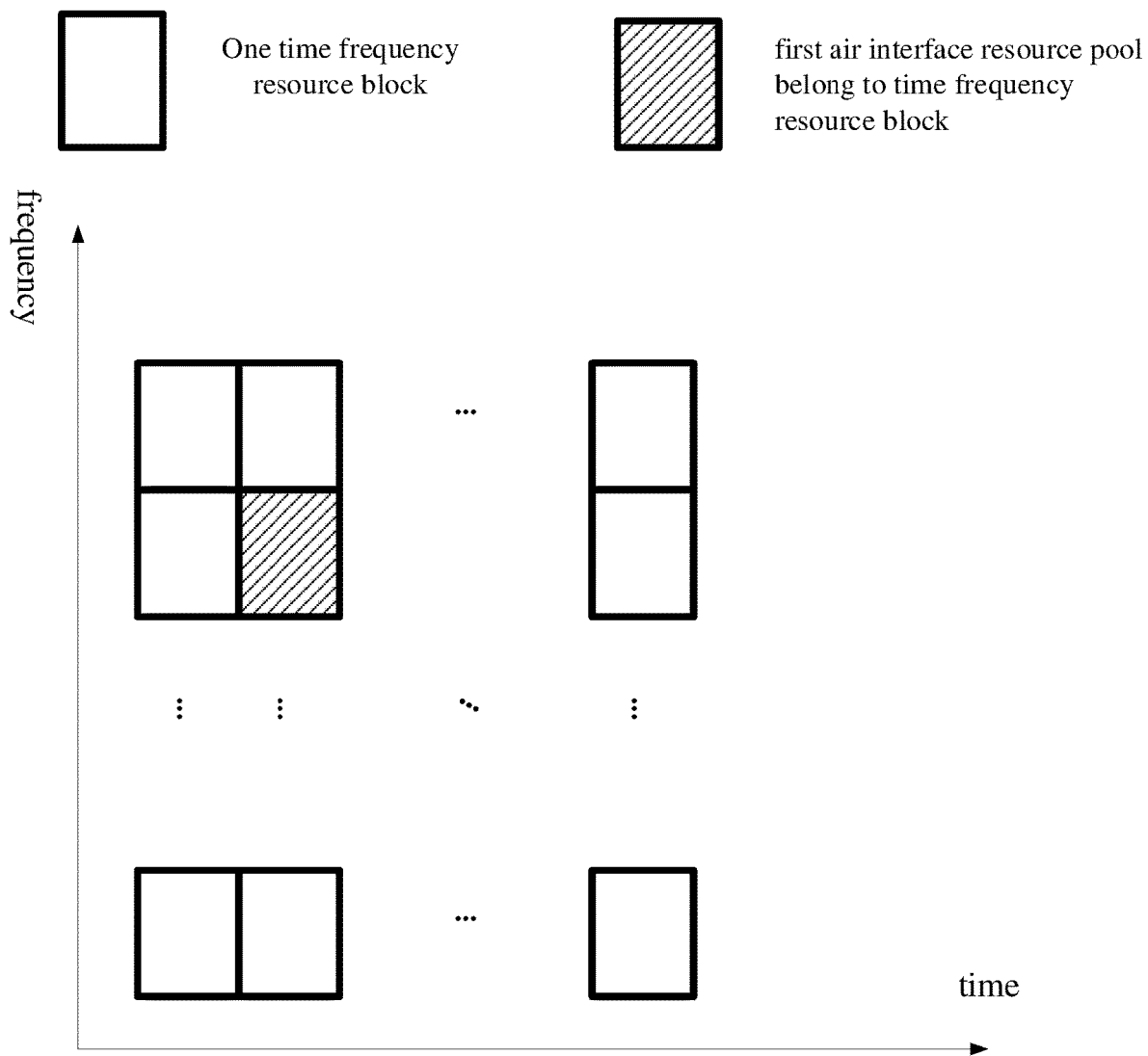
FIG. 9 shows a schematic diagram of a physical layer of the uplink channel according to one embodiment of the present disclosure.

Embodiment IX illustrates a schematic diagram of a physical layer of the uplink channel, as shown in FIG. 9. In FIG. 9, a thick line frame represents a time-frequency resource block, and a diagonal line-filled slanted line frame represents a time-frequency resource block to which the first air interface resource pool belongs.

In one embodiment, the physical layer uplink channel is a PUSCH (physical uplink shared channel).

In one embodiment, the physical layer uplink channel is a sPUSCH (shorten physical uplink shared channel).

In one embodiment, the physical layer uplink channel corresponds to a transmission channel, which is UL-SCH (uplink shared channel).

In one embodiment, the physical layer uplink channel is PUCCH.

In one embodiment, the physical layer uplink channel is a NB (narrow band)-PUSCH.

Embodiment X

Figure 10:
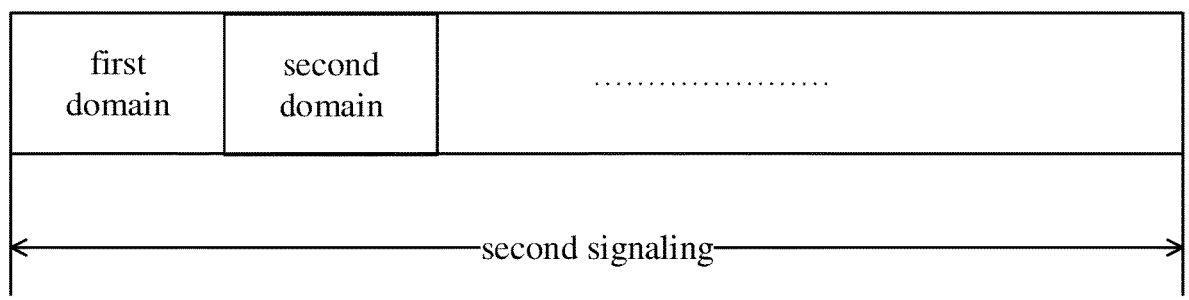
FIG. 10 shows a schematic diagram of the second signaling according to one embodiment of the present disclosure.

Embodiment X illustrates a schematic diagram of the second signaling, as shown in FIG. 10. In the embodiment X, the second signaling includes the first domain and the second domain, wherein the first domain indicates whether the first wireless signal in the present discloses is correctly decoded.

In one embodiment, if the first wireless signal indicated by the first domain in the second signaling is not correctly decoded, the second domain in the second signaling is the second control information of the present disclosure; otherwise, the second domain in the second signaling is configured for other indications.

In one embodiment, the other indications are HARQ-ACKs for other terminals (terminals other than the transmitter of the first wireless signal).

In one embodiment, the other indications are indications of power control.

In one embodiment, the payload size (that is the number of bits included) of the second signaling is related to the number of air interface resources in the first space resource pool of the present disclosure.

In one embodiment, the load size of the second signaling is fixed.

In one embodiment, the second signaling is physical layer signaling.

In one embodiment, the second signaling is common to the cell.

In one embodiment, the time-frequency resource occupied by the second signaling is associated with the time-frequency resource occupied by the first wireless signal (i.e. the time-frequency resource occupied by the first wireless signal is hidden style indication).

Embodiment XI

Figure 11:
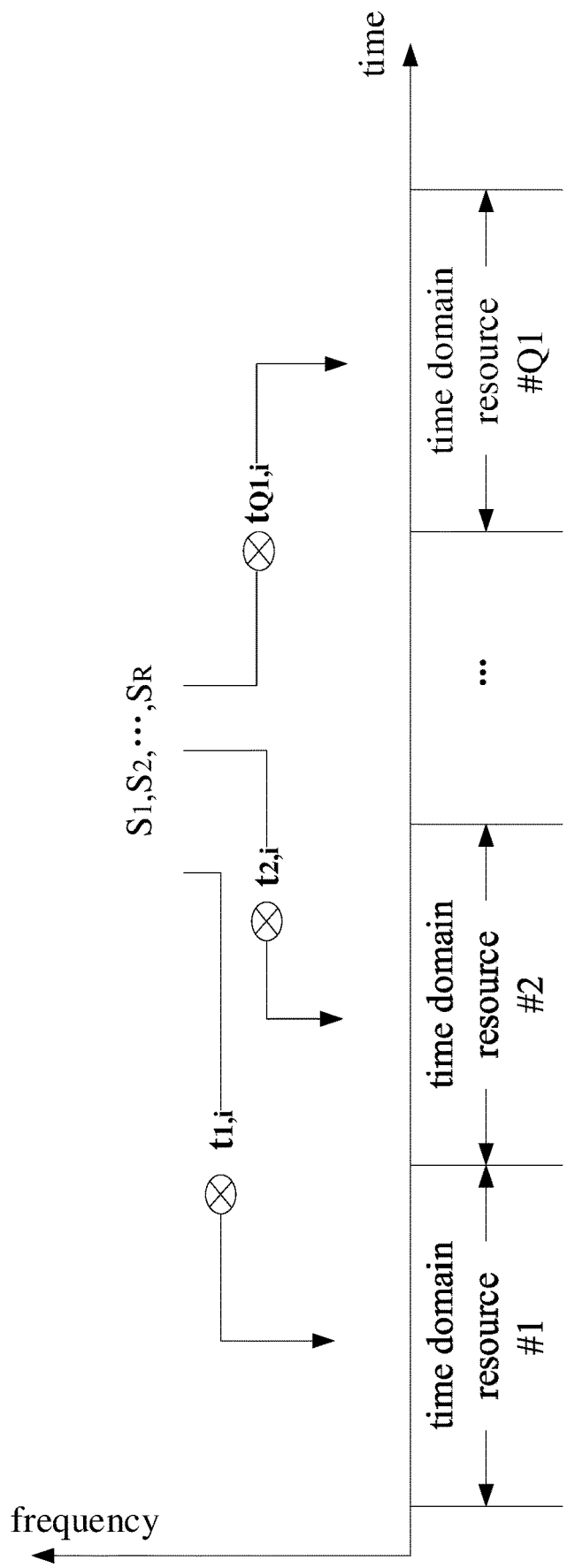
FIG. 11 shows a schematic diagram of the Q1 multi-access signatures according to one embodiment of the present disclosure.

Embodiment XI illustrates a schematic diagram of the Q1 multi-access signatures, as shown in FIG. 11. In the embodiment XI, the multiple access signatures included in the Q1 air interface resource(s) in the present disclosure are respectively Q1 multiple access signatures, and the Q1 is greater than 1; the Q1 wireless sub-signals in the present disclosure are respectively transmitted in the real-time domain resources #1, #2, ..., # Q1 in the Q1 time domain resources of FIG. 11, and any two of the Q1 time domain resources do not overlap.

The multi-access signatures Q1 are generated by $S_1$, $S_2$, ..., $S_R$, where the generation way of the multiple access signature # i (i is an arbitrary integer of 1 to Q1) as below:

$$\{S_1, S_2, \ldots, S_R\} \otimes \{S_{1,i}, S_{2,i}, \ldots, S_{Q1,i}\}$$

Where, $\otimes$ represents the Kronecker product, $\{S_1, S_2, \ldots, S_R\}$ is the plural sequences being unrelated with i, $\{S_{1,i}, S_{2,i}, \ldots, S_{Q1,i}\}$ is the plural sequences being related with i.

Where, $\{S_1, S_2, \ldots, S_R\} \otimes S_{j,i}$ is mapped to the time domain resource # j, and j is a positive integer from 1 to Q1.

In one embodiment, any two of the Q1 wireless sub-signals occupy the same frequency domain resource.

In one embodiment, each wireless sub signal in the Q1 wireless sub-signals occupy the Q1 multiple access signature.

Embodiment XII

Figure 12:
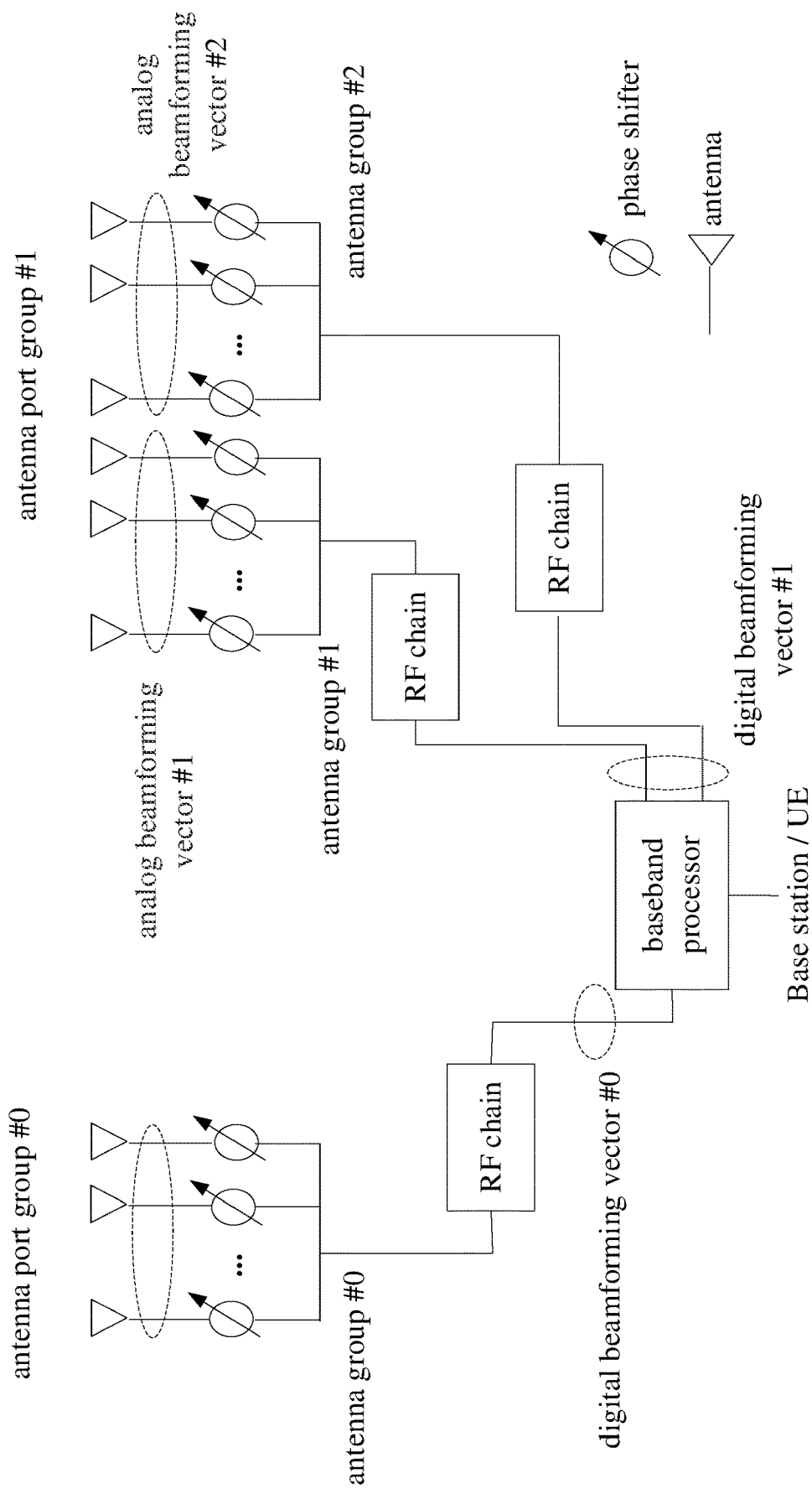
FIG. 12 shows a schematic diagram of the antenna port groups according to one embodiment of the present disclosure.

Embodiment XII illustrates a schematic diagram of the antenna port groups, as shown in FIG. 12. In FIG. 12, one antenna port group includes a positive integer number of antenna ports; one antenna port is formed by superimposing antennas in a positive integer number of antenna groups through antenna virtualization; and one antenna group includes a positive integer antenna. An antenna group is connected to the baseband processor through an RF (radio frequency) chain, and different antenna groups correspond to different RF chains. A mapping coefficient of all antennas within a positive integer number of antenna groups included in a given antenna port to the given antenna port constitutes a beamforming vector corresponding to the given antenna port. The mapping coefficients of the plurality of antennas included in any given antenna group included in a given integer number of antenna groups included in the given antenna port to the given antenna port constitute an analog beamforming vector of the given antenna group. The diagonal arrangement of the analog beamforming vectors corresponding to the positive integer antenna groups constitutes an analog beam shaping matrix corresponding to the given antenna port. The mapping coefficients of the positive integer number of antenna groups to the given antenna port constitute a digital beamforming vector corresponding to the given antenna port. The beamforming vector corresponding to the gi antenna porgy is obtained by multiplying the analog beam shaping matrix and the digital beam shaping vector corresponding to the given antenna port. Different antenna ports n one antenna port group are composed of the same antenna group, and different antenna ports in the same antenna port group correspond to different beamforming vectors.

Two antenna port groups are shown in FIG. 12: antenna port group #0 and antenna port group #1. Specifically, the antenna port group #0 is composed of an antenna group #0, and the antenna port group #1 is composed of an antenna group #1 and an antenna group #2. The mapping coefficients of the plurality of antennas in the antenna group #0 to the antenna port group #0 constitute an analog beamforming vector #0, and the mapping coefficients of the antenna group #0 to the antenna port group #0 constitute a number beamforming vector #0, The mapping coefficients of the plurality of antennas in the antenna group #1 and the plurality of antennas in the antenna group #2 to the antenna port group #1 constitute an analog beamforming vector #1 and analog beamforming vector #2, respectively. The mapping coefficients of the antenna group #1 and the antenna group #2 to the antenna port group #1 constitute a digital beamforming vector #1. The mapping coefficients of the plurality of antennas in the antenna group #1 and the plurality of antennas in the antenna group #2 to the antenna port group #1 constitute an analog beamforming vector #1 and analog beamforming vector #, respectively. 2. The mapping coefficients of the antenna group #1 and the antenna group #2 to the antenna port group #1 constitute a digital beamforming vector #1. A beamforming vector responding to any one of the antenna port groups #0 is obtained by multiplying the analog beamforming vector #0 and the digital beamforming vector #0. The beamforming vector corresponding to any antenna port in the antenna port group #1 is an analog beam shaping matrix formed by diagonally arranging the analog beamforming vector #1 and the analog beamforming vector #2 obtained from the product of the digital beamforming vector #1.

In one sub embodiment, the Q1 antenna port group(s) in the present disclosure includes the antenna port group #0 and the antenna port group #1 in FIG. 12.

In one sub-embodiment, one antenna port group includes one antenna port. For example, the antenna port group #0 in FIG. 12 includes one antenna port.

As an auxiliary embodiment of the foregoing sub-embodiment, the analog beam shaping matrix corresponding to the one antenna port is reduced into an analog beamforming vector, the digital beamforming vector corresponding to the one antenna port is reduced to a scalar, and the beamforming vector corresponding to the one antenna port is equal to the analog beamforming vector corresponding to the one antenna port.

In one sub-embodiment, one antenna port group includes a plurality of antenna ports. For example, the antenna port group #1 in FIG. 12 includes a plurality of antenna ports.

As an auxiliary embodiment of the foregoing sub-embodiment, the plurality of antenna ports correspond to the same analog beam shaping matrix and different digital beamforming vectors.

In a sub-embodiment, different antenna terminal groups correspond to different simulation beam forming array.

In a sub-embodiment, any two antenna terminals in an antenna terminal group are QCL.

In a sub-embodiment, any two antenna terminals in an antenna terminal group are spatial QCL.

Embodiment XIII

Figure 13:
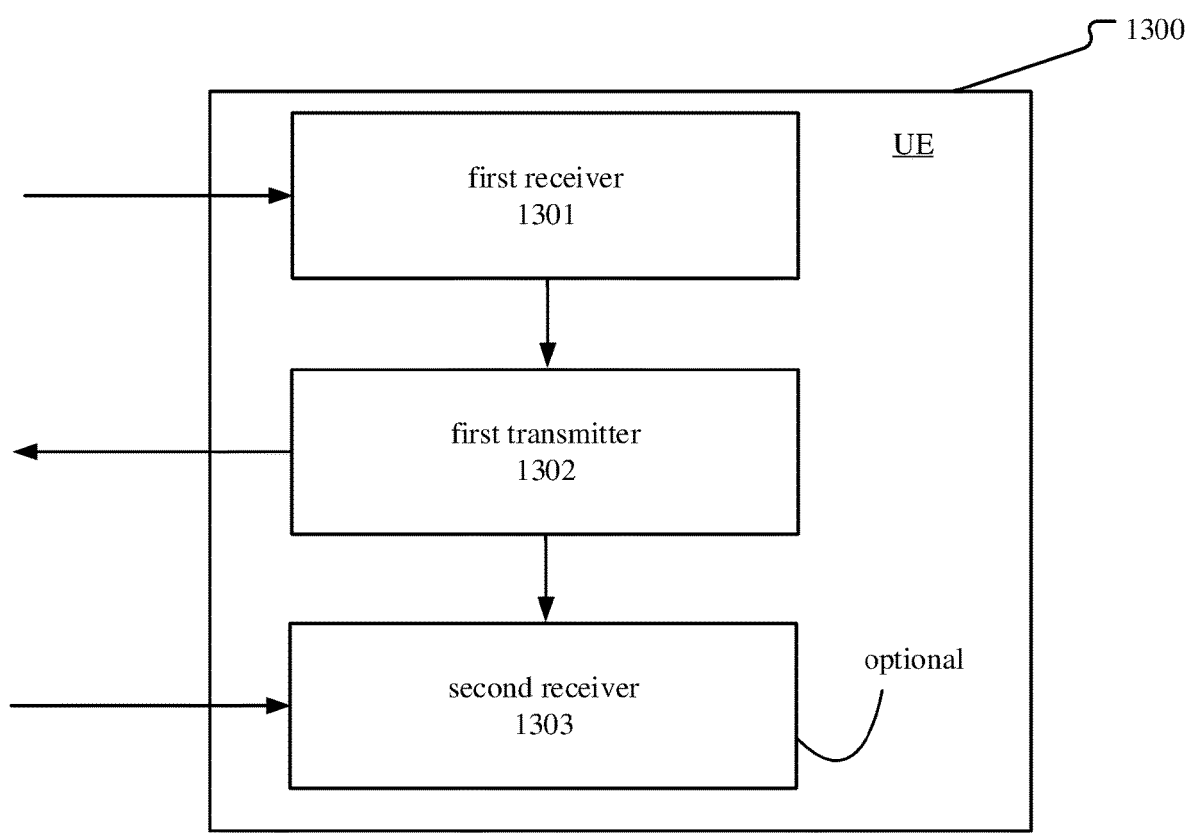
FIG. 13 shows a structural block diagram of a processing device in a UE according to one embodiment of the present disclosure.

Embodiment XIII illustrates a structural block diagram of a processing device in a UE, as shown in FIG. 13. In the FIG. 13, the UE processing device 1300 is primarily comprised of a first receiver 1301, a first transmitter 1302 and a receiver 1303, wherein the second receiver 1303 is optional.

The first receiver 1301 receives the first signaling; the transmitter 1302 transmits the first wireless signal in the Q1 air interface resource(s); the second receiver 1303 receives the second control information.

In embodiment XIII, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s), the first wireless signal includes Q1 wireless sub signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free; the second control information is configured to indicate Q2 antenna port group(s) from the Q1 antenna port group(s), the Q2 is a positive integer not greater than the Q1.

In one embodiment, the first receiver 1301 includes the receiver 456 and the receiving processor 452 of the embodiment IV.

In one embodiment, the first transmitter 1302 includes the transmitter 456 and the transmitting processor 455 of the embodiment IV.

In one embodiment, the second receiver 1303 includes the receiver 456 and the receiving processor 452 of the embodiment IV.

In one embodiment, the first receiver 1301, the first transmitter 1302 and the second receiver 1303 all includes the antenna 450 of the embodiment IV.

In one embodiment, the first receiver 1301, the first transmitter 1302 and the second receiver 1303 all includes the controller/processor 490 of the embodiment IV.

In one embodiment, the first signaling is common to the cell.

In one embodiment, the first signaling is associated with a first air interface pool, the Q1 air interface resource pool belongs to the first air interface resource pool.

Embodiment XIV

Figure 14:
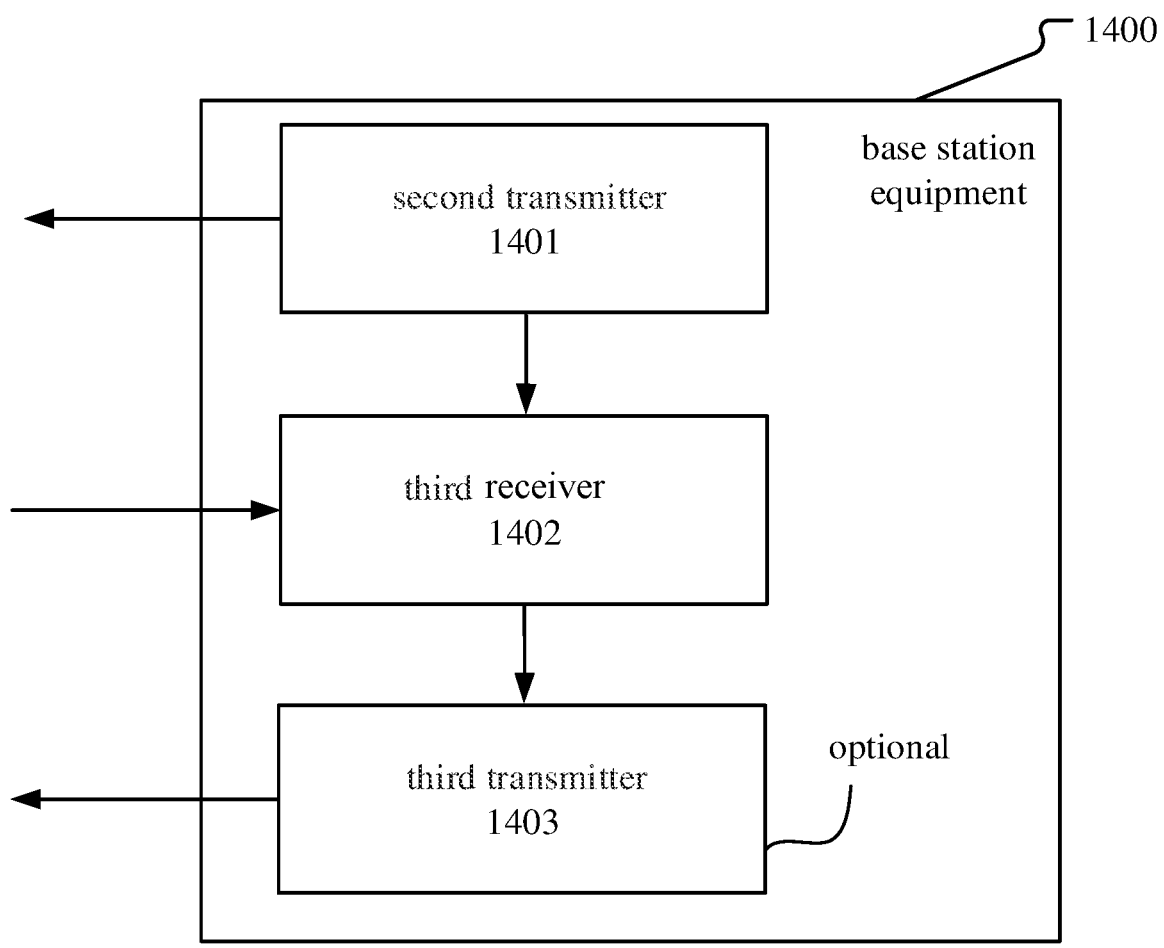
FIG. 14 shows a structural block diagram of a processing device in the base station equipment according to one embodiment of the present disclosure.

Embodiment XIV illustrates a structural block diagram of a processing device in the base station equipment, as shown in FIG. 14. In FIG. 14, the processing device 1400 in the base station equipment is primarily comprised of a second transmitter 1401, a third receiver 1402, and a third transmitter 1403, wherein the third transmitter 1403 is optional.

The second transmitter 1401 transmits the first signaling; the third receiver 1402 receives the first wireless signal in the Q1 air interface resource(s); and the third transmitter 1403 transmits the second control information.

In the embodiment XIV, the first signaling is configured to determine L1 multiple access signature group(s), any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s), the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free; the second control information is configured to indicate Q2 antenna port group(s) from the Q1 antenna port group(s), the Q2 is a positive integer not greater than the Q1.

In a sub-embodiment, the second transmitter 1401 includes the transmitter 416 and the transmitting processor 415 of the embodiment IV.

In a sub-embodiment, the third receiver 1402 includes the receiver 416 and the receiving processor 412 of the embodiment IV.

In a sub-embodiment, the third transmitter 1403 includes the transmitter 416 and the transmitting processor 415 of the embodiment IV.

In a sub-embodiment, the second transmitter 1401, the third receiver 1402 and the third transmitter 1403 all includes the antenna 420 of the embodiment IV.

In a sub-embodiment, the second transmitter 1401, the third receiver 1402 and the third transmitter 1403 all includes the controller/processor 440 of the embodiment IV.

One of ordinary skill in the art can appreciate that all or part of the above steps can be completed by a program to instruct related hardware, and the program can be stored in a computer readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The application is not limited to any specific combination of software and hardware. The user equipment, terminal and UE in the present disclosure include but are not limited to a drone, a communication module on the drone, a remote control aircraft, an aircraft, a small aircraft, a mobile phone, a tablet computer, a notebook, a vehicle communication device, a wireless sensor, an internet card, Internet of Things terminal, RFID terminal, NB-IOT terminal, MTC (Machine Type Communication) terminal, eMTC (enhanced MTC), data card, network card, vehicle communication device, low-cost mobile phone, low Cost equipment such as tablets. The base station in the present disclosure includes, but is not limited to, a macro communication base station, a micro cell base station, a home base station, a relay base station, a gNB (NR Node B), a TRP (Transmitter Receiver Point), and the like.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for wireless communication in a user equipment (UE), comprising:
   receiving a first signaling; and
   transmitting a first wireless signal in Q1 air interface resource(s);
   wherein the first signaling is configured to determine L1 multiple access signature group(s); any one of the L1 multiple access signature group(s) includes multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

2. The method of claim 1, further comprising:
   receiving a second control information;
   wherein the second control information is configured to indicate Q2 antenna port group(s) from the Q1 antenna port group(s), the Q2 is a positive integer not greater than the Q1.

3. The method of claim 1, further comprising:
   transmitting a second wireless signal in Q3 air interface resource(s);
   wherein the first wireless signal and the second wireless signal are respectively generated based on a first bit block, the second wireless signal is transmitted by Q3 antenna port group(s), the second control information is configured to generate the Q3 antenna port group(s), the Q3 is a positive integer, any one of the Q3 antenna port group(s) includes a positive integer number of antenna ports.

4. The method of claim 1, further comprising:
   receiving a third signaling;
   wherein the third signaling is configured to indicate a first time-frequency resource pool, and the time-frequency resource included in any of the Q1 air interface resource(s) belongs to the first time-frequency resource pool.

5. The method of claim 1, wherein the Q1 is greater than 1, the Q1 wireless sub-signals are respectively transmitted in the Q1 air interface resource(s); or, the Q1 is greater than 1, the Q1 wireless sub-signals are respectively transmitted in Q1 time domain resource(s), and any two of the Q1 time domain resource(s) do not overlap; or the first signaling indicates the L1 multiple access signature group(s) from a first multiple access signature pool; the first multiple access signature pool is composed of a plurality of multiple access signatures, if the Q1 is a positive integer greater than 1, the Q1 air interface resource(s) including the Q1 multiple access signatures belong to one of the L1 multiple access signature group(s); if the Q1 is 1, the Q1 multiple access signature included in the Q1 air interface resource(s) is one multiple access signature in the first multiple access signature pool and outside the L1 multiple access signature groups.

6. A method for wireless communication in a base station (BS), comprising:

transmitting a first signaling; and receiving a first wireless signal in Q1 air interface resource(s);

wherein the first signaling is configured to determine L1 multiple access signature group(s), any one of the L1 multiple access signature group(s) includes a plurality of multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s); any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s); first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

7. The method of claim 6, further comprising:

transmitting a second control information;

wherein the second control information is configured to indicate Q2 antenna port group(s) from the Q1 antenna port group(s), the Q2 is a positive integer not greater than the Q1.

8. The method of claim 6, further comprising:

receiving a second wireless signal in Q3 air interface resource(s);

wherein the first wireless signal and the second wireless signal are respectively generated based on a first bit block; the second wireless signal is transmitted by Q3 antenna port group(s); the second control information is configured to generate the Q3 antenna port group(s); the Q3 is a positive integer, any one of the Q3 antenna port group(s) includes a positive integer number of antenna ports.

9. The method of claim 6, further comprising:

transmitting a third signaling;

wherein the third signaling is configured to indicate first time-frequency resource pool, and the time-frequency resource included in any of the Q1 air interface resource(s) belongs to the first time-frequency resource pool.

10. A user equipment (UE) for a wireless communication, comprising:

a first receiver, receiving a first signaling; and a first transmitter transmitting a first wireless signal in Q1 air interface resource(s);

wherein the first signaling is configured to determine L1 multiple access signature group(s), any one of the L1 multiple access signature group(s) includes a plurality of multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s); any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

11. The UE of claim 10, further comprising:

a second receiver, receiving a second control information;

wherein the second control information is configured to indicate Q2 antenna port group(s) from the Q1 antenna port group(s); the Q2 is a positive integer not greater than the Q1.

12. The UE of claim 11, wherein, the first transmitter transmits a second wireless signal in Q3 air interface resource(s); wherein the first wireless signal and the second wireless signal are respectively generated based on a first bit block; the second wireless signal is transmitted by Q3 antenna port group(s); the second control information is configured to generate the Q3 antenna port group(s); the Q3 is a positive integer; any one of the Q3 antenna port group(s) includes a positive integer number of antenna ports.

13. The UE of claim 10, wherein the first receiver receives a third signaling; wherein the third signaling is configured to indicate first time-frequency resource pool, and the time-frequency resource included in any of the Q1 air interface resource(s) belongs to the first time-frequency resource pool.

14. The UE of claim 10, wherein the Q1 is greater than 1; the Q1 wireless sub-signals are respectively transmitted in the Q1 air interface resource(s); or, the Q1 is greater than 1, the Q1 wireless sub-signals are respectively transmitted in Q1 time domain resource(s), and any two of the Q1 time domain resource(s) do not overlap.

15. The UE of claim 10, the first signaling indicates the L1 multiple access signature group(s) from a first multiple access signature pool; the first multiple access signature pool is composed of a plurality of multiple access signatures, if the Q1 is a positive integer greater than 1; the Q1 air interface resource(s) including the Q1 multiple access signatures belong to one of the L1 multiple access signature group(s); if the Q1 is 1, the Q1 multiple access signature included in the Q1 air interface resource(s) is one multiple access signature in the first multiple access signature pool and outside the L1 multiple access signature group(s).

16. A base station equipment for a wireless communication, comprising:

a second transmitter, transmitting a first signaling; and
a third receiver, receiving a first wireless signal in Q1 air interface resource(s);
wherein the first signaling is configured to determine L1 multiple access signature group(s), any one of the L1 multiple access signature group(s) includes a plurality of multiple access signatures; each of the Q1 air interface resource(s) includes a time-frequency resource and a multiple access signature; the first wireless signal includes Q1 wireless sub-signal(s), and the Q1 wireless sub-signal(s) is(are) respectively transmitted by Q1 antenna port group(s) the first wireless signal includes Q1 wireless sub-signal(s), and the Q1 wireless sub-signal(s) is(are) respectively transmitted by Q1 antenna port group(s), any one of the Q1 antenna port group(s) is composed of a positive integer number of antenna ports; the L1 is a positive integer; the Q1 is a positive integer greater than 1, the multiple access signatures included in any two of the Q1 air interface resource(s) are different, only when the Q1 multiple access signatures included in the Q1 air interface resource(s) belong to one of the L1 multiple access signature group(s), first wireless signal can be assumed to be transmitted by a terminal; or the Q1 is 1, the Q1 multiple access signature included in the Q1 air interface resource(s) is a multiple access signature other than the L1 multiple access signature group(s); the transmission of the first wireless signal is grant-free.

17. The base station equipment of claim 16, further comprising:
a third transmitter, transmitting a second control information;
wherein the second control information is configured to indicate Q2 antenna port group(s) from the Q1 antenna port group(s), the Q2 is a positive integer not greater than the Q1.

18. The base station equipment of claim 17, wherein the second wireless signal in Q3 air interface resource(s) is received, wherein the first wireless signal and the second wireless signal are respectively generated based on a first bit block, the second wireless signal is transmitted by Q3 antenna port group(s), the second control information is configured to generate the Q3 antenna port group(s), the Q3 is a positive integer, any one of the Q3 antenna port group(s) includes a positive integer number of antenna ports.

19. The base station equipment of claim 16, wherein the second transmitter transmits a third signaling; wherein the third signaling is configured to indicate first time-frequency resource pool, and the time-frequency resource included in any of the Q1 air interface resource(s) belongs to the first time-frequency resource pool.

20. The base station equipment of claim 16, wherein the Q1 is greater than 1, the Q1 wireless sub-signals are respectively transmitted in the Q1 air interface resource(s); or, the Q1 is greater than 1, the Q1 wireless sub-signals are respectively transmitted in Q1 time domain resource(s), and any two of the Q1 time domain resource(s) do not overlap; or the first signaling indicates the L1 multiple access signature group(s) from a first multiple access signature pool, the first multiple access signature pool is composed of a plurality of multiple access signatures, if the Q1 is a positive integer greater than 1, the Q1 air interface resource(s) included in the Q1 multiple access signatures belongs to the L1 multiple access signature, if the Q1 is 1, the Q1 multiple access signature included in the Q1 air interface resource(s) is one multiple access signature in the first multiple access signature pool and outside the L1 multiple access signature group(s).

* * * * *